US011399202B2

(12) United States Patent
Korte et al.

(10) Patent No.: US 11,399,202 B2
(45) Date of Patent: Jul. 26, 2022

(54) ANALYTICS IN VIDEO/AUDIO CONTENT DISTRIBUTION NETWORKS

(71) Applicant: Q'ligent Corporation, Melbourne, FL (US)

(72) Inventors: Ted Korte, Satellite Beach, FL (US); Sergey Lobanov, Nizhny Novgorod (RU); Maxim Uvarov, Nizhny Novgorod (RU); Anatoly Shishin, Nizhny Novgorod (RU); Andrey Kochetkov, Cary, NC (US)

(73) Assignee: Q'ligent Corporation, Melbourne, FL (US)

( * ) Notice: Subject to any disclaimer, the term of this patent is extended or adjusted under 35 U.S.C. 154(b) by 0 days.

(21) Appl. No.: 16/839,596

(22) Filed: Apr. 3, 2020

(65) Prior Publication Data

US 2020/0322661 A1 Oct. 8, 2020

Related U.S. Application Data

(60) Provisional application No. 62/830,047, filed on Apr. 5, 2019, provisional application No. 62/830,056, filed on Apr. 5, 2019, provisional application No. 62/830,062, filed on Apr. 5, 2019.

(51) Int. Cl.
| | |
|---|---|
| G06F 15/16 | (2006.01) |
| H04N 21/24 | (2011.01) |
| G06F 11/34 | (2006.01) |
| H04L 41/50 | (2022.01) |
| H04L 43/12 | (2022.01) |
| H04L 43/08 | (2022.01) |

(52) U.S. Cl.
CPC ...... *H04N 21/2407* (2013.01); *G06F 11/3409* (2013.01); *G06F 11/3466* (2013.01); *H04L 41/5032* (2013.01); *H04L 43/08* (2013.01); *H04L 43/12* (2013.01); *H04N 21/2408* (2013.01)

(58) Field of Classification Search
CPC ............ H04N 21/2407; H04N 21/2408; G06F 11/3409; G06F 11/3466; H04L 41/5032; H04L 43/08; H04L 43/12
See application file for complete search history.

(56) References Cited

U.S. PATENT DOCUMENTS

| | | | | |
|---|---|---|---|---|
| 2014/0068348 | A1* | 3/2014 | Mondal | H04L 41/16 714/45 |
| 2016/0373944 | A1* | 12/2016 | Jain | H04W 24/02 |
| 2018/0217888 | A1* | 8/2018 | Colgrove | G06F 11/076 |
| 2020/0092172 | A1* | 3/2020 | Kumaran | H04B 17/345 |

* cited by examiner

Primary Examiner — Ryan J Jakovac
(74) Attorney, Agent, or Firm — Volpe Koenig

(57) ABSTRACT

A method may comprise collecting data from a core network, an operator network and a customer premise network. KPI values corresponding to one or more KPIs may be determined, based on the collected data. KQI values corresponding to one or more KQIs may be determined, based on the one or more of the determined KPI values. The determined KQI values may be output to an operator. In an embodiment, data collected from the core network may include data collected from one or more analyzer devices and head end probes. Data collected from a customer premise network may include data collected from last mile equipment or customer premise probes.

17 Claims, 27 Drawing Sheets

| Pros | Cons |
|---|---|
| Personalized Experiences | 18% Churn |
| Real-time User Feedback | Poor Quality |
| Quick to Launch | Loss of Control |
| Easy to Scale | Latency Problems |
| Strong DRM | Global Competition |
| Multi-Platform | Complex Business Models |
| Linear and Nonlinear | DIY with Direct to Consumer |
| Global Reach | Short-Form and VOD Preference |
|  | Limited Standarts and Regulation |
FIG. 5
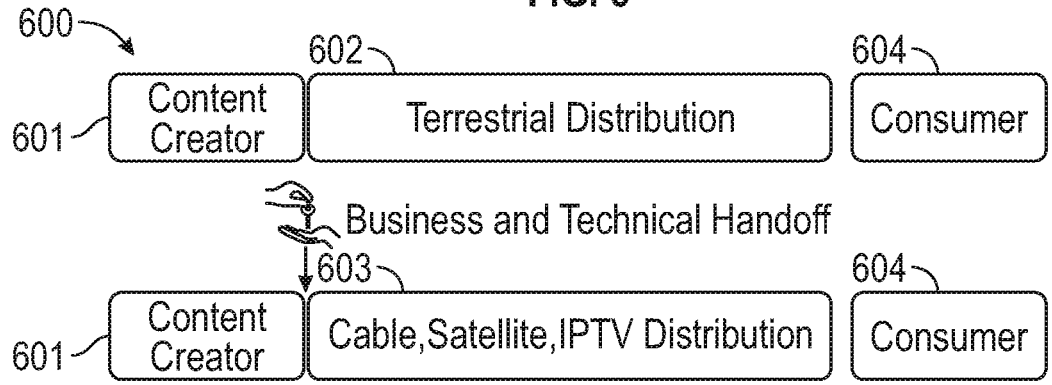
FIG. 6
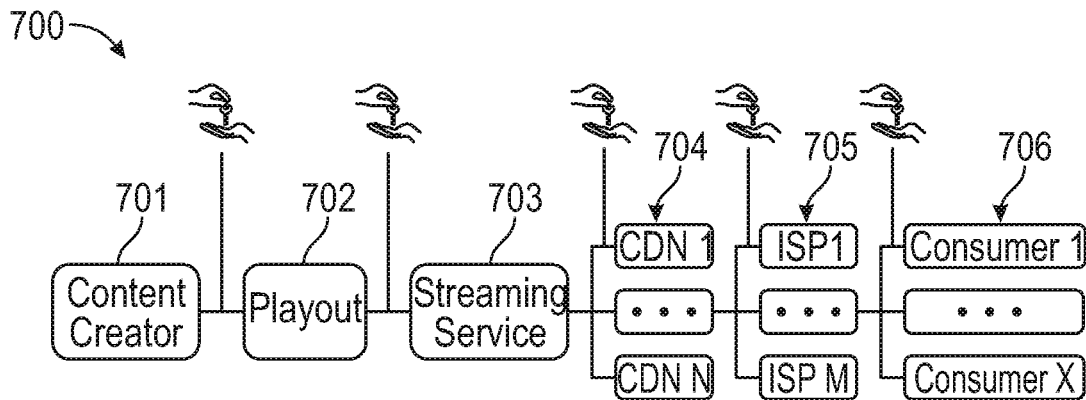
FIG. 7

ANALYTICS IN VIDEO/AUDIO CONTENT DISTRIBUTION NETWORKS

CROSS REFERENCE TO RELATED APPLICATIONS

This application claims the benefit of U.S. Provisional Application No. 62/830,047, filed Apr. 5, 2019, U.S. Provisional Application No. 62/830,056, filed Apr. 5, 2019, and U.S. Provisional Application No. 62/830,062, filed Apr. 5, 2019, which are incorporated by reference as if fully set forth.

BACKGROUND

Content owners maintain little control upon turning content products over to content service providers including over the air (OTA), cable, satellite, and Internet protocol television (IPTV) service providers. In particular, content owners may maintain even less control when content is provided via content distribution networks and over the top (OTT) service providers. To complicate matters even further, content owners lack insight into a viewer's quality-of-experience (QoE) as more and more 3rd party services become part of an end-to-end distribution solution. Content owners may find themselves not knowing what exactly is being heard or displayed at the subscriber end. New methods are needed to expose this vacuum of information and ensure a high quality product is provided via proper measurement of viewer engagement.

SUMMARY

A method may comprise collecting data from a core network, an operator network and a customer premise network. Key performance indicator (KPI) values corresponding to one or more KPIs may be determined, based on the collected data. Key quality indicator (KQI) values corresponding to one or more KQIs may be determined, based on the one or more of the determined KPI values. The determined KQI values may be output to an operator. In an embodiment, data collected from the core network may include data collected from one or more analyzer devices and head end probes. Data collected from a customer premise network may include data collected from last mile equipment or customer premise probes.

BRIEF DESCRIPTION OF THE DRAWINGS

FIG. 5 is a table which illustrates pros and cons of OTT delivery;

FIG. 6 is an illustration of a traditional linear service provider mix;

FIG. 7 is an illustration of an OTT Service Provider Mix;

DETAILED DESCRIPTION OF THE PREFERRED EMBODIMENTS

The aggregation of quality of service (QoS), quality of experience (QoE) and viewer behavior data produces extremely large, but trusted data sets. Processing this data with sophisticated machine learning (ML) and Artificial Intelligence (AI) technologies is proving to be very effective in extracting maximum value from the content and advertising. Methods and systems disclosed herein may be integrated with emerging technologies and best practices for harnessing the power of cloud computing, AI and massive datasets to improve the viewer experience and maximize revenue from every viewing platform.

The media delivery business has become a game of seconds. The lines have blurred between broadcast and other Internet protocol (IP) related services for delivering media. Content creation is growing from original television (TV) series and movies, to how-to videos and social media posts. Access to content for consumers seems limitless. Analysts have stated we are in the era of "infinite" media.

Digital media in the form of audio and video is the preferred medium for nearly all our daily activities including: entertainment, sports, gaming marketing, promoting, advertising, shopping, reviews, education, inspiration/ideas, connecting and even general communication.

With so much content being consumed for a wider variety of purposes, viewing time and attention has grown shorter, thus making every second count. A 99.9% service availability was once a good number with a captive audience, but in today's fragmented world that leaves 31,536 precious seconds on the table each year.

Media consumption has increased overall but has steadily decreased from the TV set since about 2010 with the increasing use of smartphones and tablets. This adds the challenges of finding where consumers are and determining the right-sized content they want to consume.

Figure 1:
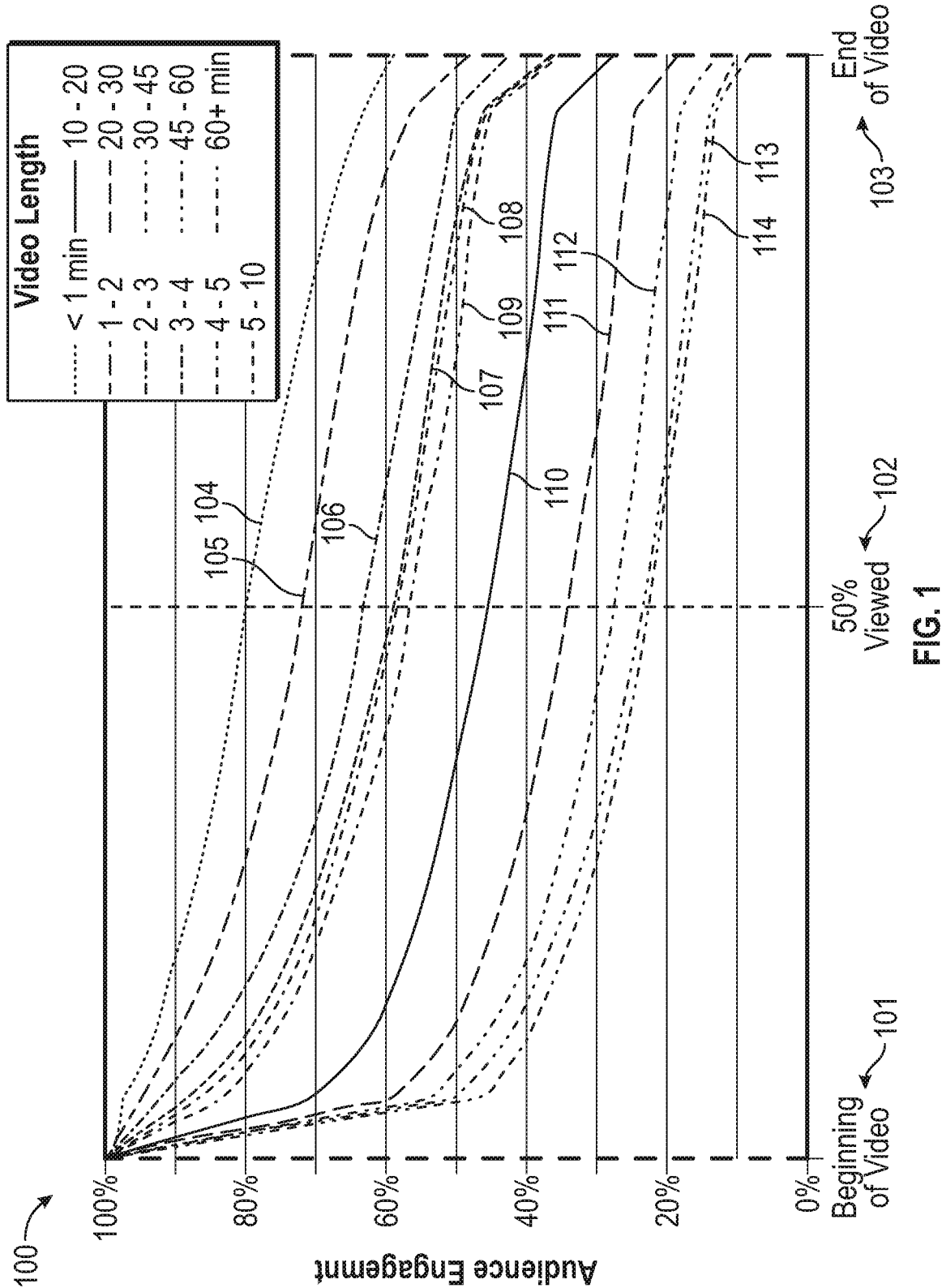
FIG. 1 is an illustration of audience engagement between the beginning of a video and the end of a video.

FIG. 1 is an illustration 100 of audience engagement between the beginning of a video 101, 50% view mark of a video 102 and the end of a video 103. Over time, audience engagement drops in line with video length. For example, audience engagement of a 60+ min video 114 falls faster than audience engagement of a film which is less than one minute long 104 and others which are only a few minutes long, for example, a 1-2 minute long video 105 and a 2-3 minute video 106. Various other video lengths are illustrated in FIG. 1, for example, a 3-4 minute video 107, 4-5 minute video 108, 5-10 minute video 109, 10-20 minute video 110 20-30 minute video 111, 30-40 minute video 112 and 45-60 minute video 113.

Figure 2:
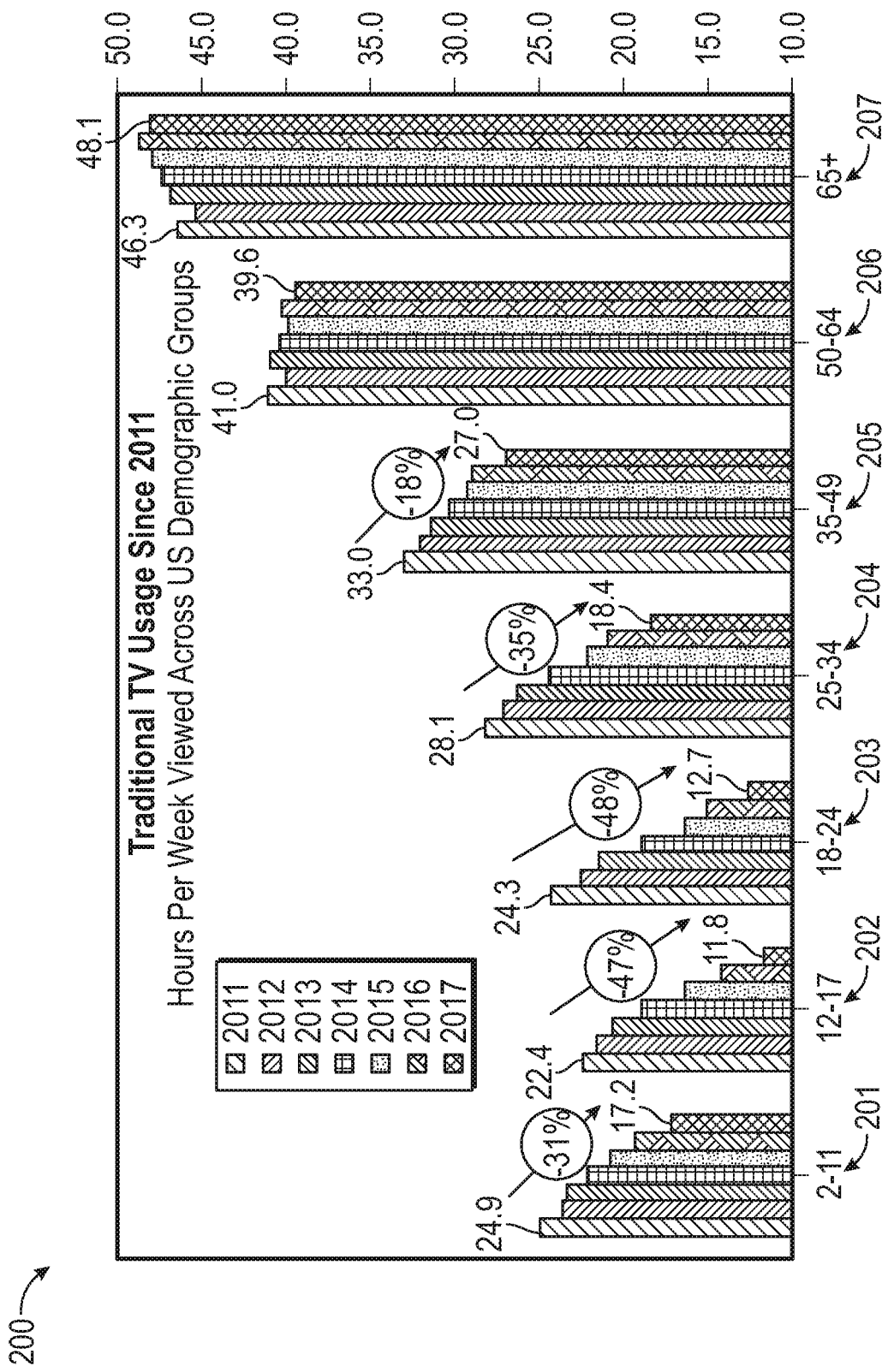
FIG. 2 is an illustration of traditional television (TV) usage between 2011 and 2017.

FIG. 2 is an illustration 200 of traditional TV usage since 2011. In FIG. 2, the x-axis shows age groups 201-207 and y-axis shows hours of television watched per week. Among a younger audience, i.e. individuals between 2 and 49 years of age, traditional television usage is falling. Usage by individuals between 2 and 11 years of age 201 has decreased at –31%. Usage by individuals between 12 and 17 years of age 202 has decreased at –47%. Usage by individuals between 18 and 24 years of age 203 has decreased at –48%. Usage by individuals between 25 and 34 years of age 204 has decreased at –35%. Usage by individuals between 35 and 49 years of age 205 has decreased at –18%. Usage by individuals between 50 and 64 years of age 206 remains relatively flat, while individuals over the age of 65 207 are watching slightly more traditional television.

The main contributor to the rapid expansion of content creation and consumption is Over the Top (OTT) delivery. OTT delivery is made possible via broadband access to a wide range of "connected" devices, including smartphones, tablets, smart TVs, video game consoles, streaming sticks and the like. This model gives consumers access, convenience and value that isn't available via traditional linear services.

Unfortunately, OTT is "Over the Top" of everything else that currently exists today. The entire broadcast model is working to adapt, but nothing quite works the same as before (prime-time, 30-second spots, ratings, even the definition of live). However, cable, satellite, Internet protocol television (IPTV) and Over the Air (OTA) delivery may not completely disappear. Each will find their place in this new media delivery ecosystem, as will all current methods of monitoring, measuring and analyzing. There may always be a need for a general linear broadcast and even a "First Mover" of sorts. There will also be a need to handle a variety of specific cases, such as personalization. Embodiments disclosed herein are equally applicable to any delivery technology, for OTA, cable, satellite, IPTV and the like. These technologies may benefit from the disclosed methods and systems by helping reduce subscriber churn.

Figure 3:
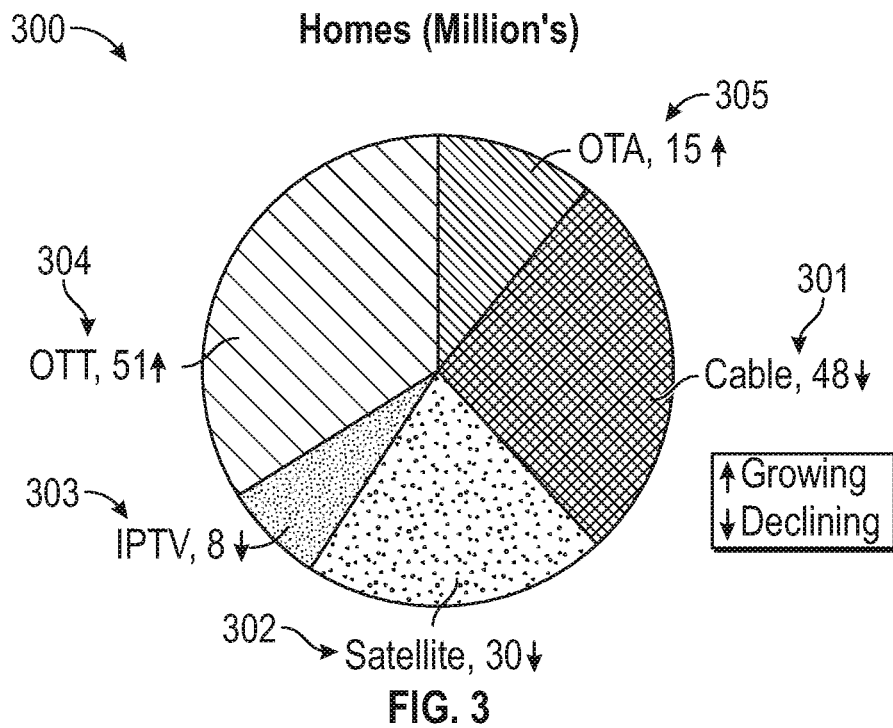
FIG. 3 is a pie chart which illustrates an approximate mix of media services provided to United States (US) homes.

FIG. 3 is a pie chart 300 which illustrates an approximate mix of media services provided to US homes. FIG. 3 illustrates that roughly 48 million US homes are serviced via cable 301, 30 million US homes are serviced via satellite 302 and 8% of homes are serviced by IPTV 303. The use of each of these services is falling while OTT 304 and OTA 305 are rising. OTT 304 is used by 51 million US homes and OTA 305 is used by 15 million homes.

There is no silver bullet which causes any particular service usage to fall. It is not solely about demographics, content type, purpose, or delivery convenience, nor is it about the recommendation, branding, or viewing quality. It is a complex equation of time-critical factors important to each individual. All of the above matters for each viewer as they consume content throughout their normal daily activities.

One question stands, "how do you compete in a world saturated with content all trying to capture the attention of a fickle and fragmented audience?" The answer may require a mix of traditional linear services along, new OTT services, and a strong data-driven approach. These traditional linear services and new OTT services may be monitored, measured and analyzed together to improve overall viewing quality.

OTT is not exclusive to audio and video delivery in the broadcast industry. It also includes messaging, social media, websites, and any other form of communications that are carried over a third party broadband connection. OTT also opens the door to reaching a "Global" audience. All of these service offerings are important considerations while understanding the overall OTT ecosystem. They compete for the same audience and, more importantly, we can learn from the techniques and technologies they successfully deployed.

Major players in the OTT services market include: Twitter Inc.; Hulu, LLC.; Netflix, Inc.; Facebook, Inc.; Rakuten, Inc.; LinkedIn Corporation; Evernote Corporation; Apple, Inc.; Amazon Inc.; Skype (Microsoft Corporation); Google, Inc.; Dropbox, Inc.

It is easy to pick out Facebook Amazon Apple Netflix Google (FAANG) from the list above as they are becoming formidable new entrants in what was once an exclusive industry of broadcast professionals. FAANG are also early pioneers in Cloud, Big Data and Artificial Intelligence technologies, giving them an advantage.

Figure 4:
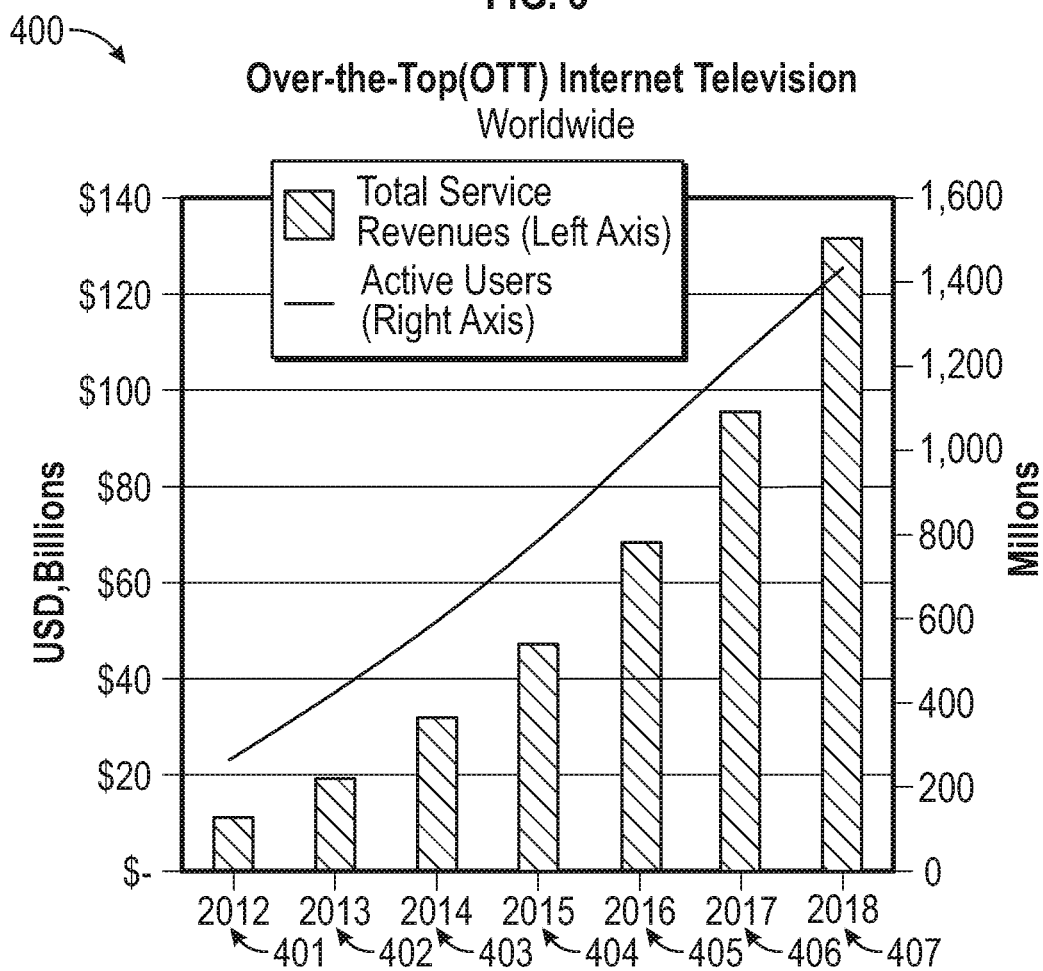
FIG. 4 is a bar chart which illustrates over the top (OTT) growth between 2012 and 2018.

FIG. 4 is a bar chart 400 which illustrates OTT growth between 2012 and 2018 401-407. As can be seen during this period, OTT growth was roughly linear and tremendous growth potential exists in OTT for the media and entertainment sector. Growth is projected to exceed $158 billion worldwide by 2025.

OTT delivery provides the unique characteristic of a one-to-one personalized experience and the ability to collect immediate feedback. OTT may also allow a quick launch and scale to reach a global multi-platform audience with any form linear or nonlinear content. To satisfy this need, content creators may need to determine the right content, right duration, right time and right platform to reach their audience in real-time. Personalization examples include searches and recommendations based on history, actor or director. Other personalization information may include the content which a subscriber would like to see on a particular device at a particular time of the day; payment preferences (i.e. subscription-ad mix); how ads are presented such as pre-roll, inserts in the content, or banners; and bookmarks to review a product later, join related communities with people of similar interests, etc. Regardless of the end goal, the first question in any decision tree for any delivery technology or topology should be, "Is the quality great?" Without knowing the answer to this first question, none of the other answers to engagement questions will be valid.

FIG. 5 is a table 500 which illustrates pros 501 and cons 502 of OTT. The pros 501 include: personalized experiences, real-time user feedback, quick to launch, easy to scale, strong DRM, multi-platform, linear and nonlinear, global reach. The cons 502 include an 18% churn, poor quality, loss of control, latency problems, global competition, complex business models, DIY with direct to consumer, short-form and video on demand (VOD) preference and limited standards and regulation.

For the media and entertainment industry, OTT may provide a competitive advantage. OTT has strengths, but is not perfect. OTT has an 18% churn rate, and most consumers have more than one streaming video on demand (SVOD) subscription in an effort to create their own personalized programing bundles.

Studies consistently place poor quality in the top four reasons why viewers abandon video. Video abandonment is alarming, but this problem has existed since the remote control and DVR; it just could not be measured until now. With short form content consumption on the rise, even short duration problems become very noticeable. For example, imagine a five-second delay in a four-second pre-roll ad. OTT delivery may have the same issues as normal digital video delivery but with the addition of problems related to sending video over a packet switched network and multi-profile adaptive bitrates.

FIG. 6 is an illustration 600 of a traditional linear service provider mix 600. Traditionally, the mix included a content creator 601 providing content for terrestrial distribution 602 to the consumer 604. More recently, the content creator 601 may have to provide content for distribution via multiple sources including cable, satellite and IPTV distribution 603 to the same consumer 604. As shown in FIG. 6, key collection may be performed once, downstream from the content creator 601 when cable, satellite, IPTV distribution 603 is used.

OTT is even more complicated because it is more difficult to control end to end than traditional approaches. Over the Air broadcasters once controlled the entire chain through their transmitters, while Cable, Satellite, and IPTV distribution offered a single handoff technically and commercially. Then it was in the best interest of the provider to provide the best quality experience possible.

For OTT, playout is moving to a cloud via 3rd party providers, as is the streaming service (Transcoding, Packaging, DRM, Origination, etc.). Meanwhile, multi-CDN and multi-internet service provider (ISP) solutions are fast becoming the norm for reliable delivery and reaching consumers on-the-go. This is a smart approach as it gains incredible scale and speed to market, but it comes with a cost: loss of control.

There may potentially be several hand-offs with OTT between third party service providers thus making an end-to-end/holistic data aggregation and monitoring system a "must-have" for a successful OTT channel.

FIG. 7 is an illustration 700 of an OTT service provider mix 700. Content may be created by a content creator 701 and may be played out 702 over a streaming service 703. The streaming service may employ 1 . . . N content distribution networks 704 corresponding to 1 . . . M internet service providers 705. Each ISP may distribute the content to one or more consumers 706 on their networks.

In FIG. 7, key collection may be performed at multiple stages during distribution. For example, kay collection may be performed after content is provided from the content creator 701, after playout 702, after output from a streaming service 703 and prior to CDN 704, prior to ISP 705, and prior to being provided to a consumer 706.

Very little standardization exists or has been adopted for OTT. Regulation remains focused more on traditional broadcast and not on the evolving OTT. There is also a recent push for low-latency OTT delivery, which will cause another round of growing pains and problems until everything settles again.

Branding means more today than ever. Brand Sharing has gained momentum as a way to deliver the best possible experience. Instead of showing a 30-second Ad at every opportunity, a brand agreement for revenue sharing is worked out. That monetization extends well beyond subscription or an ad placement. With increasingly complex business models, it now falls back onto the network, content creators, and advertisers to ensure their content was delivered as expected and a sufficient audit trail exists to reconcile these more complex agreements.

Several other trends are evolving such as original content creation, global audiences, and direct-to-consumer (DTC). This too pushes the fight for eyeballs further upstream and of interest to more than one party.

The best way to optimize any content for delivery, including OTT content, is to start with high-quality delivery to a target audience and respond to the feedback in real-time. To achieve this, new technologies may be used to look for answers, most notably Artificial Intelligence (AI)—or AI technologies.

AI has been talked about for decades, but adoption and useful results have been a rollercoaster ride. AI didn't really become a reality until cloud, big data, and IoT enabled the capture, store and processing of vast quantities of data.

Figure 8:
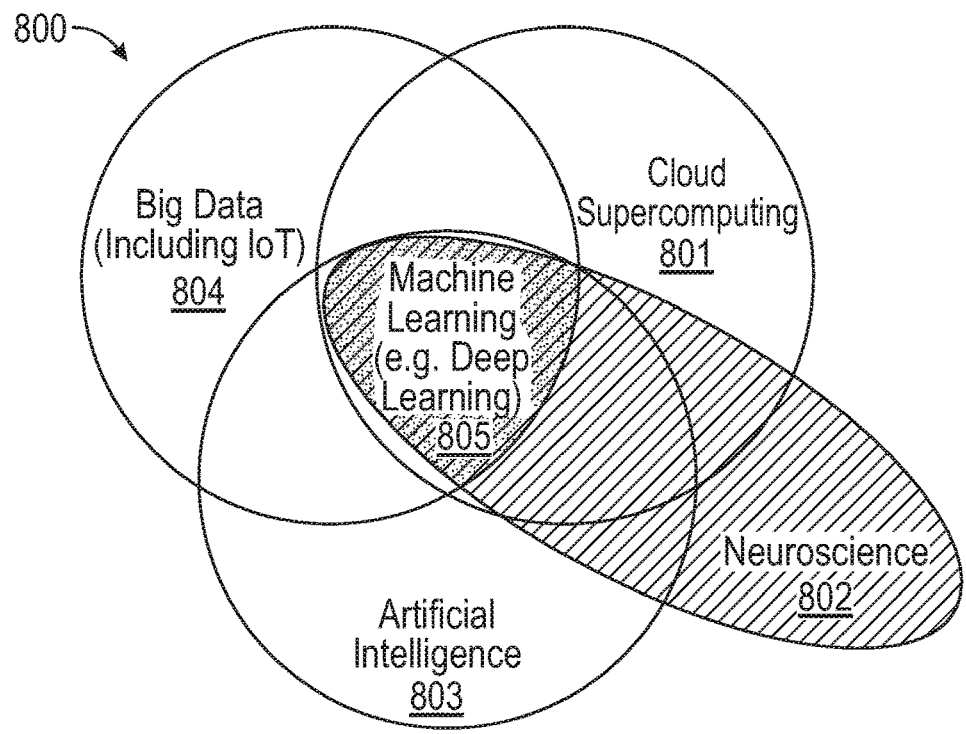
FIG. 8 is a Venn diagram which illustrates example mega trends of artificial intelligence (AI)

FIG. 8 is a Venn diagram 800 which illustrates example mega trends of AI. In FIG. 8 machine learning 805 is shown to be an intersection of cloud supercomputing 801, neuroscience 802, artificial intelligence 803 and big data 804.

Large datasets can hide a lot of potential value, but it has become a challenge to find patterns, trends, and anomalies in these datasets. The rise of data science as a multidisciplinary field of study grew from the interest of organizations as they seek to gain competitive advantages from hidden knowledge. Methods and approaches from computer science, mathematics and statistics have been joined together to extract and interpret knowledge. Approaches vary from Data Warehousing and Online Analytical Processing (OLAP) to Data Mining and Machine Learning (ML).

Figure 9:
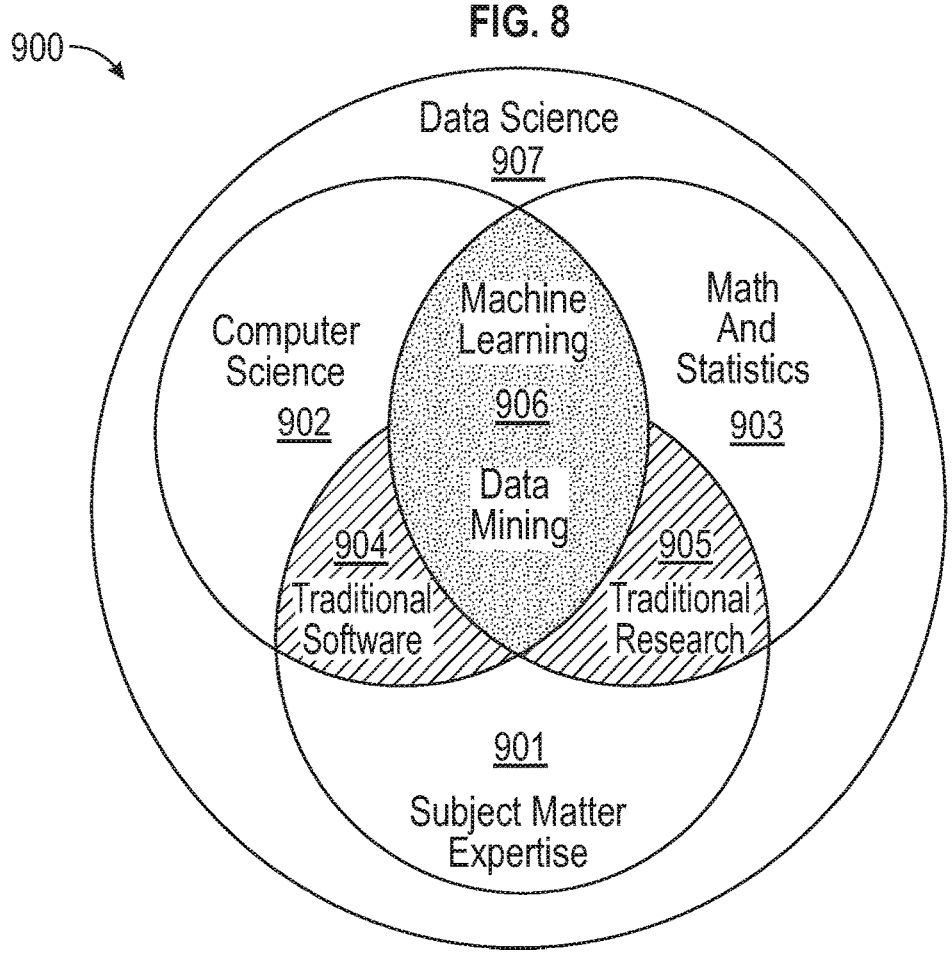
FIG. 9 is a Venn diagram which illustrates that data science is a combination of subject matter expertise, math and statistics and computer science.

FIG. 9 is a Venn diagram 900 which illustrates that data science 907 is a combination of subject matter expertise 901, math and statistics 903 and computer science 902. Traditional software 904 may only consider subject matter experience 901 and computer science 902. Traditional research 905 may only consider math and statistics 903 coupled with subject matter expertise 901. On the other hand, once subject matter expertise 901, math and statistics 903 and computer science 902 are combined, artificial intelligence, i.e. machine learning and data mining 906, becomes capable.

Data mining applications are good candidates for prediction tasks. Trying to determine future outcomes based on estimations from historic data can be as simple as guessing the classification of the next inputs. One of the practical reasons to exercise Data Mining techniques might be to identify customers who are not presently enjoying their service and to predict the possibility of them cancelling their subscription.

Data Mining may be defined as the process of discovering patterns in data, either automatically or semi-automatically. This process is supported by tools and practical techniques, also known as Machine Learning, which are used to identify the underlying structure of the data. This structure is then represented in a comprehensible manner for use in Data Mining applications. Pattern descriptions are considered the output of a learning process.

Machine Learning techniques have been used to solve various tasks of classification, regression, clustering, identification, filtering, prediction and knowledge discovery. There is a set of machine learning algorithms to address each task and these algorithms are typically divided into following categories: Reinforcement Learning; Supervised Learning; Unsupervised Learning; and Semi-supervised Learning.

Reinforcement Learning is one of the most complicated approaches. In order to maximize its performance, it allows a software agent to determine the ideal behavior within a specific context. A simple reward feedback (reinforcement signal) is required for the agent to learn its behavior.

Supervised learning (human assisted), unsupervised learning (algorithm assisted), and semi-supervised learning (mix of both) are used to solve clustering tasks.

Data categorizing may include clustering of tasks automatically and assigning observations into subsets. For example, unsupervised learning can be used in categorizing customers based on their consumption habits.

Figure 10:
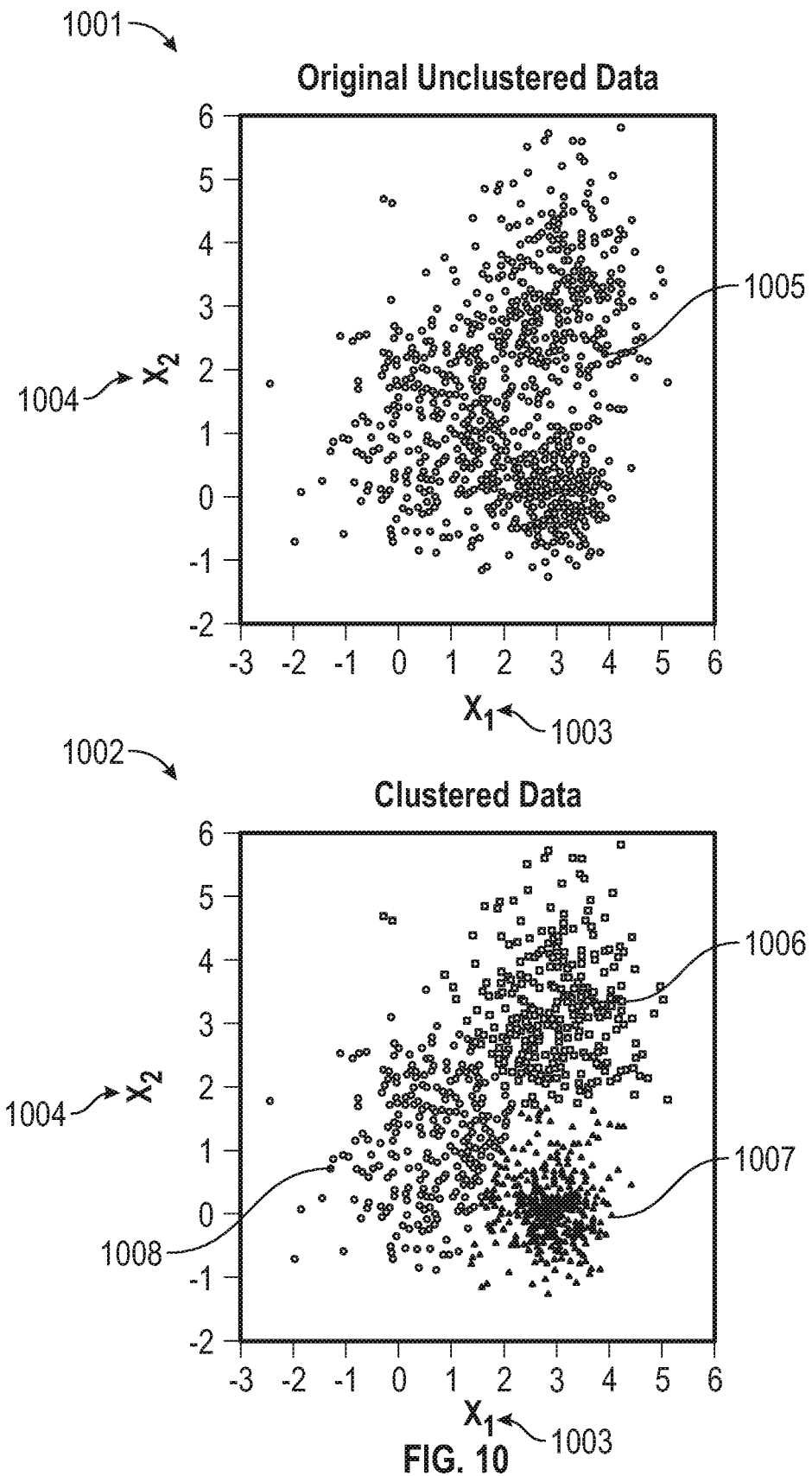
FIG. 10 is an illustration of example clustering techniques.

FIG. 10 is an illustration of an example clustering technique. In graph 1001, unclustered data is spread over X1 1003/X2 1004. The unclustered data is shown as a single circle shape 1005.

Graph 1002, on the other hand, shows the same data elements of graph 1001, shown in multiple shapes, which include a circle 1008, triangle 1007 and square 1006. In the embodiment shown in FIG. 10, clustering is generally (but is not perfectly) performed in terms of point location.

Several proven clustering methods exist which are common to unsupervised learning. Examples include k-means, Gaussian Mixture Model (GMM), and Spectral Clustering. There are also unsupervised learning methods based on Deep Learning (DL).

Figure 11:
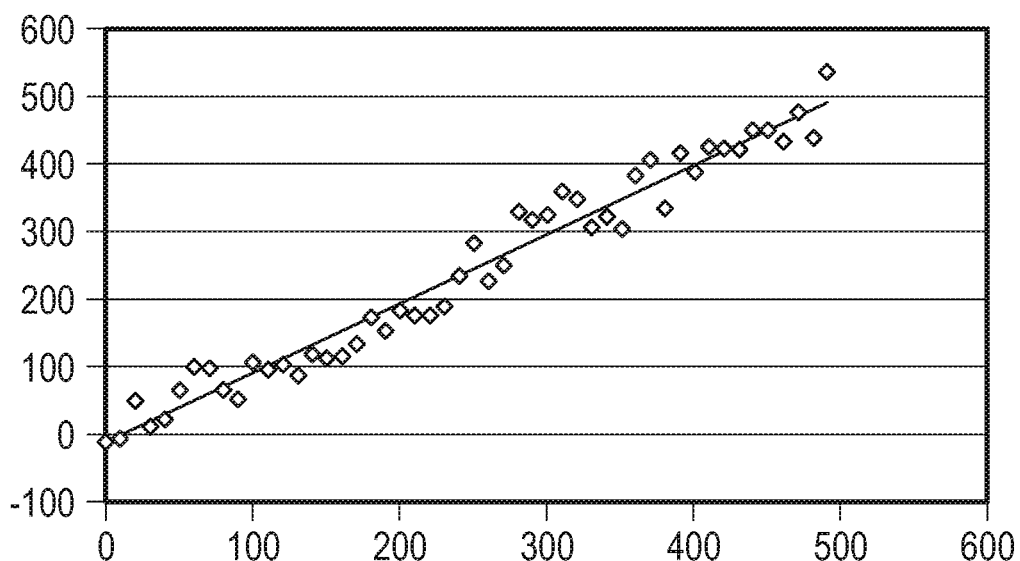
FIG. 11 includes two graphs which illustrate classification vs. regression methods.
Figure 11:
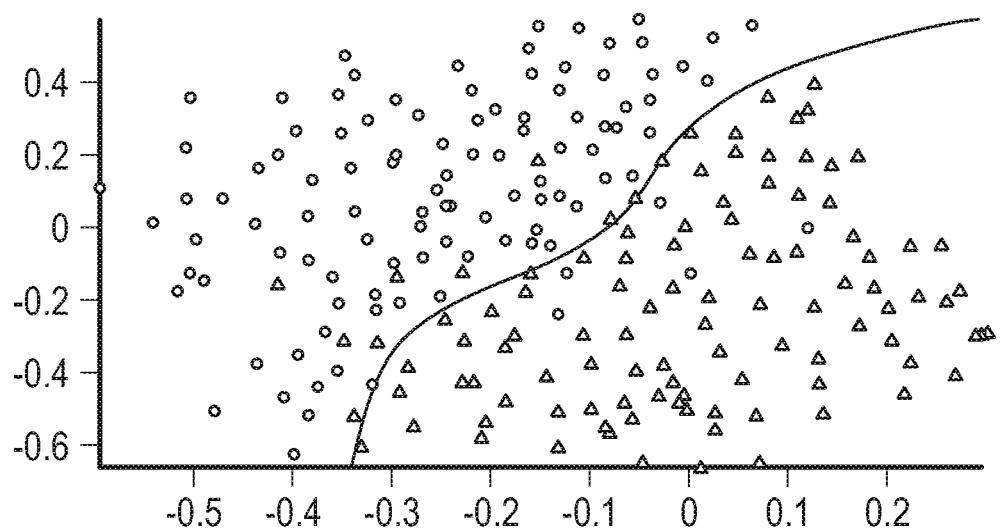

Supervised learning methods may perform classification or regression tasks. Regression and classification are both related to prediction, where regression predicts a value from a continuous set, whereas classification predicts the 'belonging' to the class. FIG. 11 includes two graphs 1101, 1102 which illustrate a regression approach and a classification approach, respectively. An example using a classification approach 1102 would be labeling customers who are known to have churned as (1), and others as (0). With this known data, a function may be constructed that separates these two categories of customers. Then an attempt to predict the category of an unknown customer may be made. An example using a regression approach 1101 would be trying to estimate the probability of churn for any customer at a given moment of time based on history of quality of content delivery issues he/she experienced. This regresses the function y=F(t) where y is an estimated probability of churn.

Before data may be processed by machine learning algorithms, features must first be defined. A feature is an individual characteristic of a pattern being observed that can be measured. Choosing informative, discriminating and independent features is a crucial step for effective algorithms in pattern recognition, classification and regression. There are two main approaches to data processing in machine learning—feature engineering and feature learning.

Figure 12A:
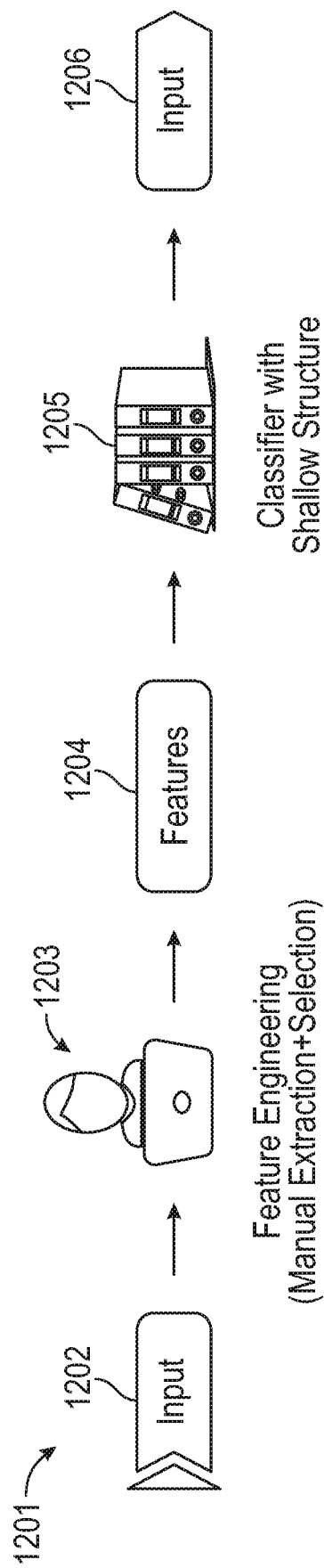
FIG. 12A is a flowchart which illustrates feature engineering.

FIG. 12A is a flowchart 1201 which illustrates feature engineering. Feature engineering is a classical approach that uses data scientists to first prepare the features, and then select the model expected to work best with those features. These models can include ensembles of decision trees, for example, using hundreds or thousands of decision trees. The main principle behind the ensemble model is that a group of weak learners come together to form a strong learner. The flowchart 1201 begins with receiving raw input data 1202. Data scientist 1203 analyses raw data 1202 and determines methods of pre-processing raw data 1202 to create different set of data—features 1204, which based on his/her domain knowledge are better suited (more efficient) for machine learning. Pre-processing may include averaging, scaling, combining, transforming etc. Data scientist 1203 also selects machine learning model 1205, which again based on his domain knowledge and on created features 1204 would be most efficient for this task. Features 1204 and model 1205 may become inputs 1206 for machine learning algorithms.

Figure 12B:
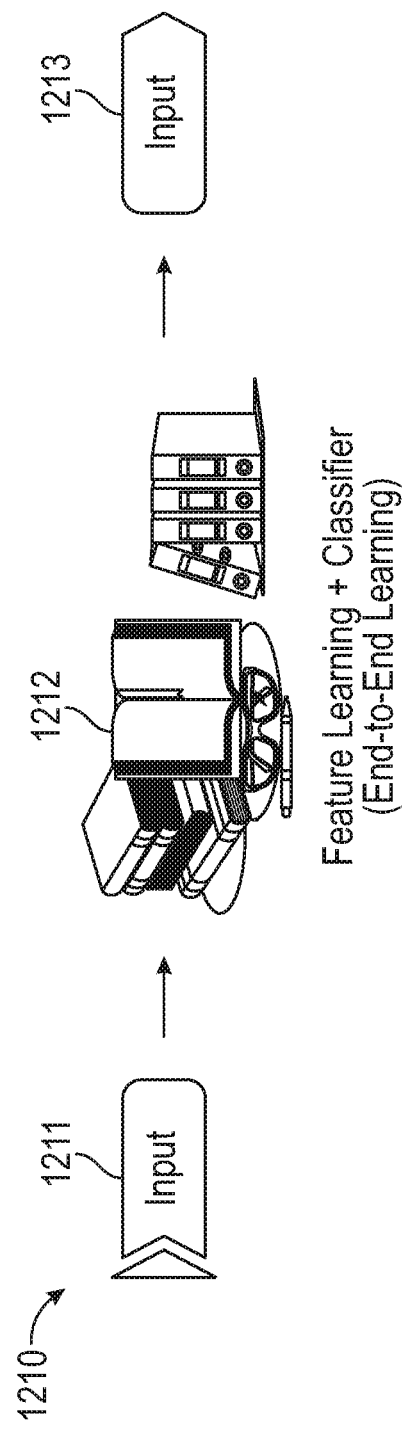
FIG. 12B is a flowchart which illustrates feature learning.

FIG. 12B is a flowchart 1210 which illustrates feature learning. Feature learning is relatively new and is typically performed with deep learning. The idea is to automatically learn a set of features from raw data and automatically select a model for machine learning. The main advantages of feature learning (deep learning) are that it can avoid the manual process of handcrafted feature engineering and can learn some hidden relations in the raw data with less preparation. In flowchart 1210, raw input data 1211 may go to a feature learning engine 1212, which generates a set of features and selects a machine learning model. Generated features and selected model may become inputs 1213 for machine learning algorithms.

The choice of AI techniques to be used in data mining applications depends on several factors, including but not limited to the raw data available and the use case to be addressed. One of the critical tasks to be solved in AI applications is to pick the right set of tools and techniques. With the help of a Data Scientist, the project tasks have to be decomposed into subsequent tasks that can be solved by a certain machine learning technique. Selection of the proper model or technique requires investigation of the data. However, the data should first be cleaned, transformed and properly ingested into the system, thus creating a pipeline for the data to follow before it can be effectively used. The data then has to be prepared for in-depth analysis.

Figure 13:
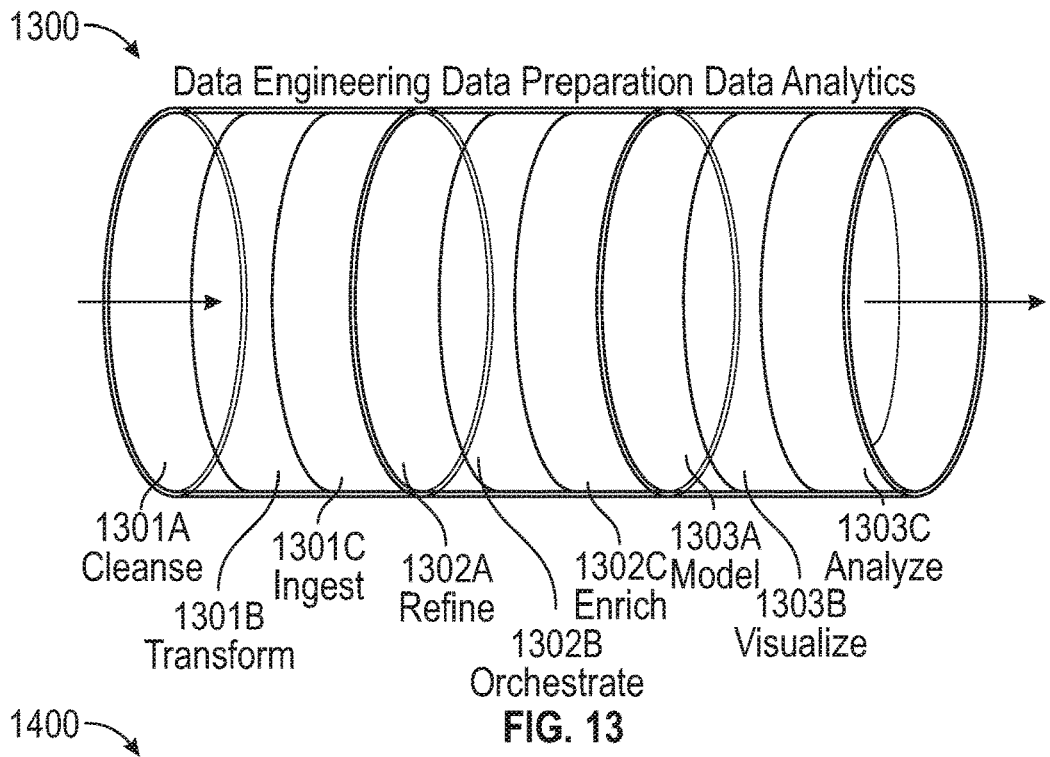
FIG. 13 is an illustration of a data analytics pipeline.

FIG. 13 is an illustration of a data analytics pipeline 1300. The pipeline 1300 may include data engineering 1301, for example, cleansing 1301A, transforming 1301B and ingesting 1301C data; data preparation 1302, for example, refining 1302A, orchestrating 1302B and enriching 1302C data; and data analytics 1303 including modeling 1303A, visualizing 1303B and analyzing 1303C data.

In data mining, the path to a solution is nonlinear. The process includes iteratively exploring, building and tuning many models. The process typically starts with feature extraction from the source data based on the domain knowledge and ends with an evaluation of the model. During the training stage in machine learning, the model's weights are updated based on input and ground truth data. During the prediction stage, the model outputs the category of each data sample. The process then repeats with the same problem, but with different models, to determine which model a better candidate.

Figure 14:
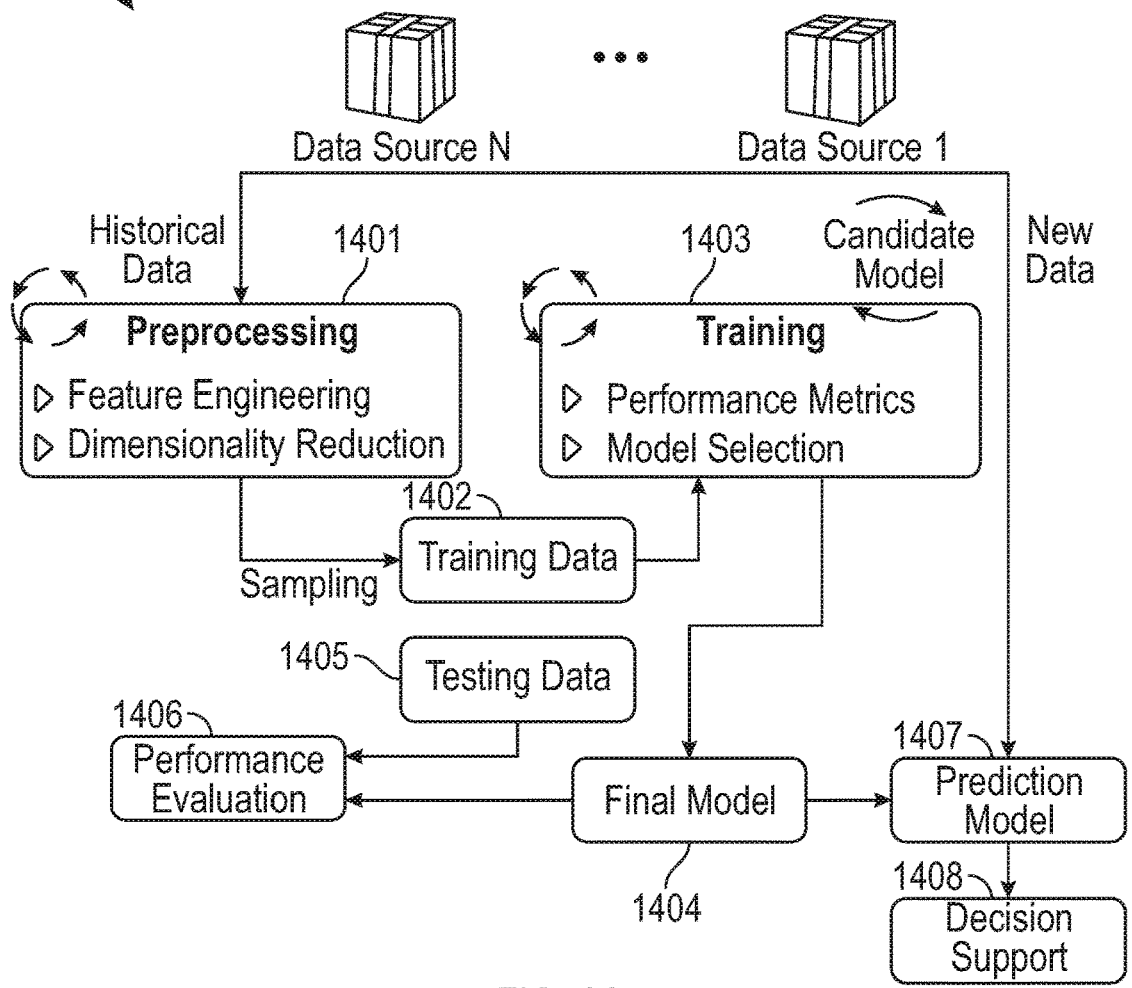
FIG. 14 is a flowchart of a machine learning process flow.

FIG. 14 is a flowchart of a machine learning process flow 1400. Historical data undergoes preprocessing 1401, which may include feature engineering and dimensionality reduction. The preprocessed data, or training data, is then used for training 1403. During training 1403, performance metrics are used to evaluate each candidate model and a Final Model 1404 is selected. Next, testing data 1405 is used for performance evaluation 1406 of the Final Model 1404. The Final Model 1404 may be established as the Prediction Model 1407. New data may then be used in the Prediction Model 1407 to provide decision support 1408.

A plurality of data sources may be used as input to a prediction model. Historical data (Data Source 1 . . . N) may be used as an initial training data set. After preprocessing 1401, cleaned training data 1402 may be used to train 1403 the learning Prediction Model. After learning is completed, new data goes to the model input. The Model makes a decision as to "At Risk" or "Not at Risk". Later, new data is augmented by actual subscriber behavior (whether he/she canceled the service within certain period, i.e. one month, or not). Then this data may be used as training data to further refine the model. This process makes constant adjustments (updates) to the model improving prediction accuracy. Dynamic updates allow the model to automatically adapt to changing environmental conditions like changing subscriber taste, tolerance to issues, equipment changes, appearance of competitors, etc.

In an embodiment, predictive tickets may be auto-generated by an Vision Analytics system. Overall performance and reliability may be improved by identifying most problematic nodes, isolating bottlenecks and understanding the time-based cause and effect of network congestion.

A make vs. buy trade off may be considered. As with most applications, various off-the-shelf software tools exist which offer basic graphical and conceptual support for all phases of the knowledge discovery process. An example of this may be at the data collection part of the pipeline. Accurate tasks and datasets can be chosen for data collection. This eases the daily work of data mining experts and allows a growing number of non-experts to try and start knowledge discovery projects. Since every use case is unique, it is necessary to know how to use these components. There are always exclusions to the rules, errors in data, etc., raising the need for further analysis of data and fine tuning of the models. The challenge nowadays is to pick the right set of techniques and organize them into the pipeline producing the reasonable and valuable output. It is critically important to be able to validate and verify models and ask the right questions.

Cloud services are available, for example, AI as a Service (Cloud Machine Learning), and offer a range of data science services and machine learning frameworks including most of those already mentioned. These are especially useful when dealing with common types of AI such as image recognition and speech to text. The most common services are provided by: Amazon Web Services (AWS); Google Cloud Platform (GCP); Microsoft Azure; IBM Cloud.

Even with off the shelf services and technologies, the challenge then becomes more organizational when you have to make these technologies, techniques and flows work in a project environment. Whether you hire or outsource to acquire the right people, some critical skills are recommended.

A data engineer is someone who can collect and prepare data. A data scientist is someone who can choose and refine the model, validate and verify the output, and choose the best candidate for production. They also bridge the gap between Data Engineering and Subject Matter Experts. A data/business analyst may be someone who is familiar with the domain area and can explain the data and the results.

Figure 15:
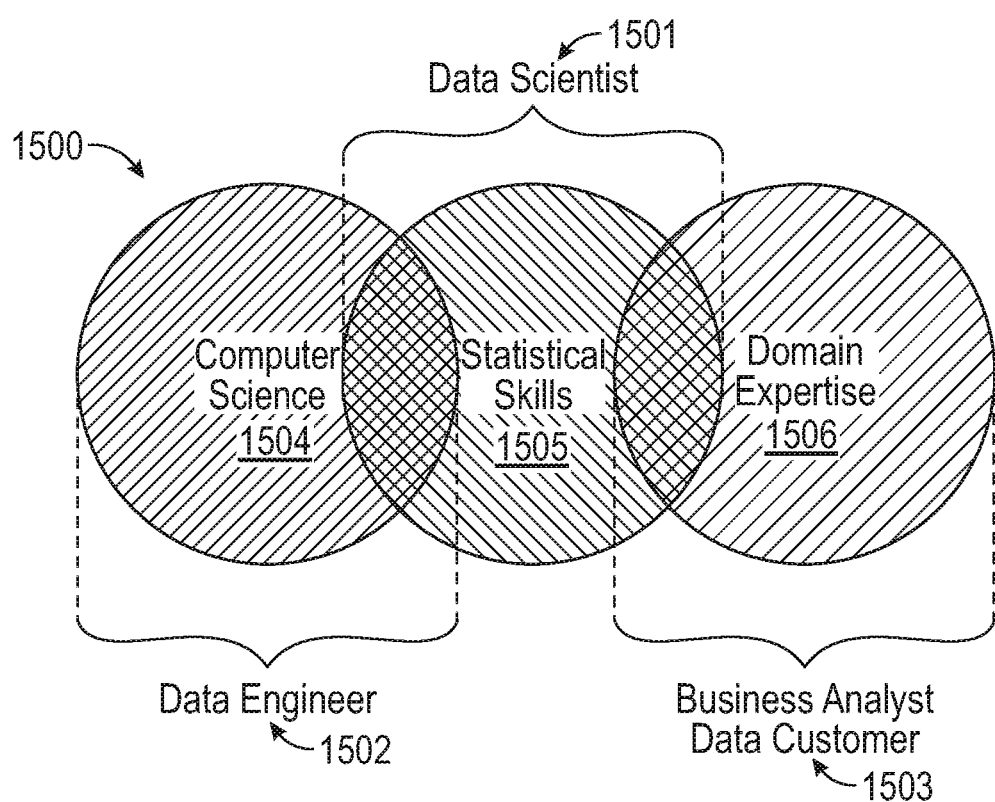
FIG. 15 is a Venn diagram which illustrates a skill set required of one expertly skilled in the art.

FIG. 15 is a Venn diagram 1500 which illustrates a skill set required of a data scientist 1501 expertly skilled in the art. A data scientist 1501 expertly skilled in the art should have a background in computer science 1504, have statistical skills 1505 and should have domain expertise 1506. One ordinarily skilled in the art should have a background which includes at least a subset of these arts. For example, a data engineer 1502 should have a background in computer science 1504. A business analyst data customer 1503 should have domain expertise 1506 and have statistical skills 1505.

Blockchain is becoming another interesting piece of enabling technology. With its inherent ability to verify a data source via distributed ledger technology, it enables a higher degree of transparency in data analytics. The input data can be automatically accepted or rejected on the basis of consensus verification. This addresses the concerns in the fourth "V" in Big Data, "Veracity" or data trust. Blockchain may also help with network security and Software Defined Networks (SDN). In some embodiments, Blockchain may be integrated herein.

One particular element of concern for network operators and content distributors is subscriber churn. Operators want to understand it, prevent it, and reverse it, but need a broader and deeper understanding of their end customers and their domain.

Subscriber Insights may include insights into: an identification of each "Silent Sufferer" vs. speculation; an informed rapid response tech support and customer care; a churn pattern analysis; a churn risk detection, prediction and prevention. An infrastructure investment strategy may comprise: network analysis & optimization; network modernization—i.e. migration to a Software Defined Network (SDN) to support a dynamically changing environment and behavior-based subscriber demands; dynamically managing Content Delivery Networks (CDNs), cache servers, and SDN bandwidth; determining the biggest bang for the buck, i.e., to determine the highest ROI.

Embodiments disclosed herein preserve video distribution quality, viewer engagement, and brand value through advanced analytics. A powerful cloud-based embodiment to monitor the quality of viewer engagement and protect media brand value across multiple delivery platforms is provided. In an embodiment, video content may be sampled globally across any content distribution channel and monitors the viewer's quality of experience on any platform, network, channel, or app at any given moment—uniquely out to the last mile. Broadcasters, multichannel video programming distributors (MVPDs) and other content owners may be provided with a valuable assessment of the health of their media operations, ranging from broad visibility to granular, in-depth reporting.

Subscriber Insights may provide insight required to understand the "Silent Sufferers" vs. speculation. A churn pattern analysis, risk detection, prediction and prevention analysis may be performed. These insights may lead to an organization's tech support and customer care being able to provide an informed and rapid response to subscriber errors and complaints. Additionally, a number of calls to a customer support center may be reduced by employing preventive actions. In this way, the silent sufferers may be met where they are and their problems may be acknowledged and solved without them first calling and complaining.

An infrastructure investment strategy may incorporate network analysis and optimization. Network modernization methods, for example, migration to a Software Defined Network (SDN) to support a dynamically changing environment and behavior based subscriber demands may improve network conditions and reduce latency, errors and the like. In an embodiment, Content Delivery Networks (CDNs), cache servers and SDN bandwidth may be dynamically managed. It is important to determine the biggest bang for the buck, i.e. the highest ROI.

New sources of data for Business Intelligence (BI) may be identified. In this way, ARPU may be grown by analyzing behavior, identifying changes, generating targeted offers, up selling and the like. In an embodiment, it may be desirable to optimize inventory of Live, Scheduled, Non-linear and on-demand content. Further, having an understanding of competitive and other external influencers may be helpful as it related to building a risk model. Other elements that may be incorporated into a model include a measurement of content performance for reuse and retirement. A closed loop service quality management may be employed to know, predict and proactively prevent.

Figure 16:
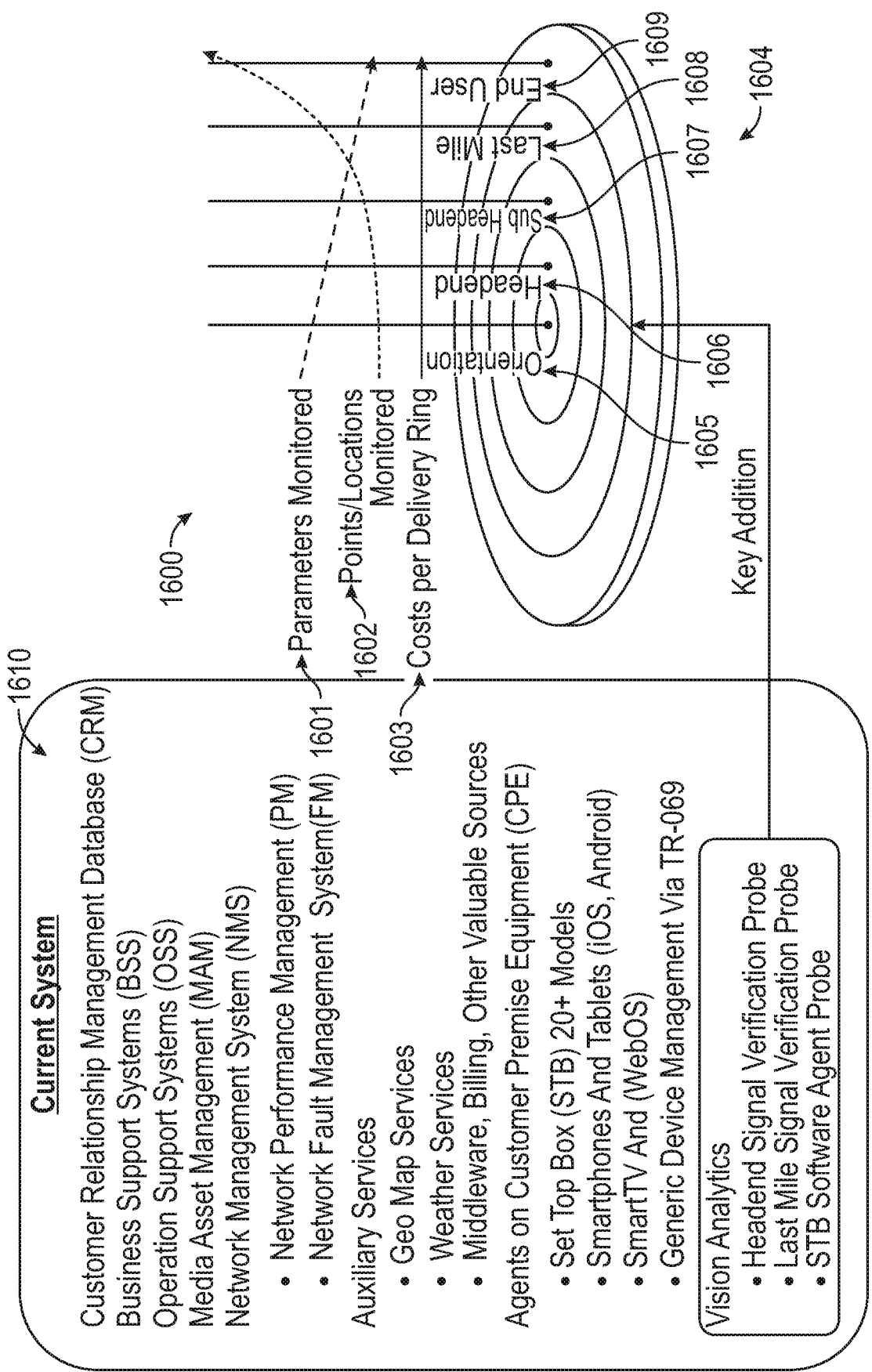
FIG. 16 is an illustration of parameters, locations and costs which may be monitored over a plurality of concentric delivery rings.

FIG. 16 is an illustration 1600 of parameters monitored 1601, points/locations 1602 and costs 1603 which may be monitored over a plurality of concentric delivery rings 1604. The concentric rings 1604 include orientation 1605, headend 1606, sub headend 1607, last mile 1608 and end user 1609 rings. Data from current systems 1610, including customer relationship management (CRM) systems, customer premise equipment (CPE), business support systems (BSS), operations support systems (OSS), mobile application management (MAM), network management systems (NMS), performance management (PM) systems, fault management (FM) systems may be monitored. Data collected may be data collected by end-user and last-mile probes. A practical approach to deploying and managing last mile and end user probes may be critical to the collection of useful data.

The concentric rings 1604 of FIG. 16 illustrate that the further away from the central office, the number of points/locations monitored 1602, including equipment and/or organizations involved, grows.

Figure 17:
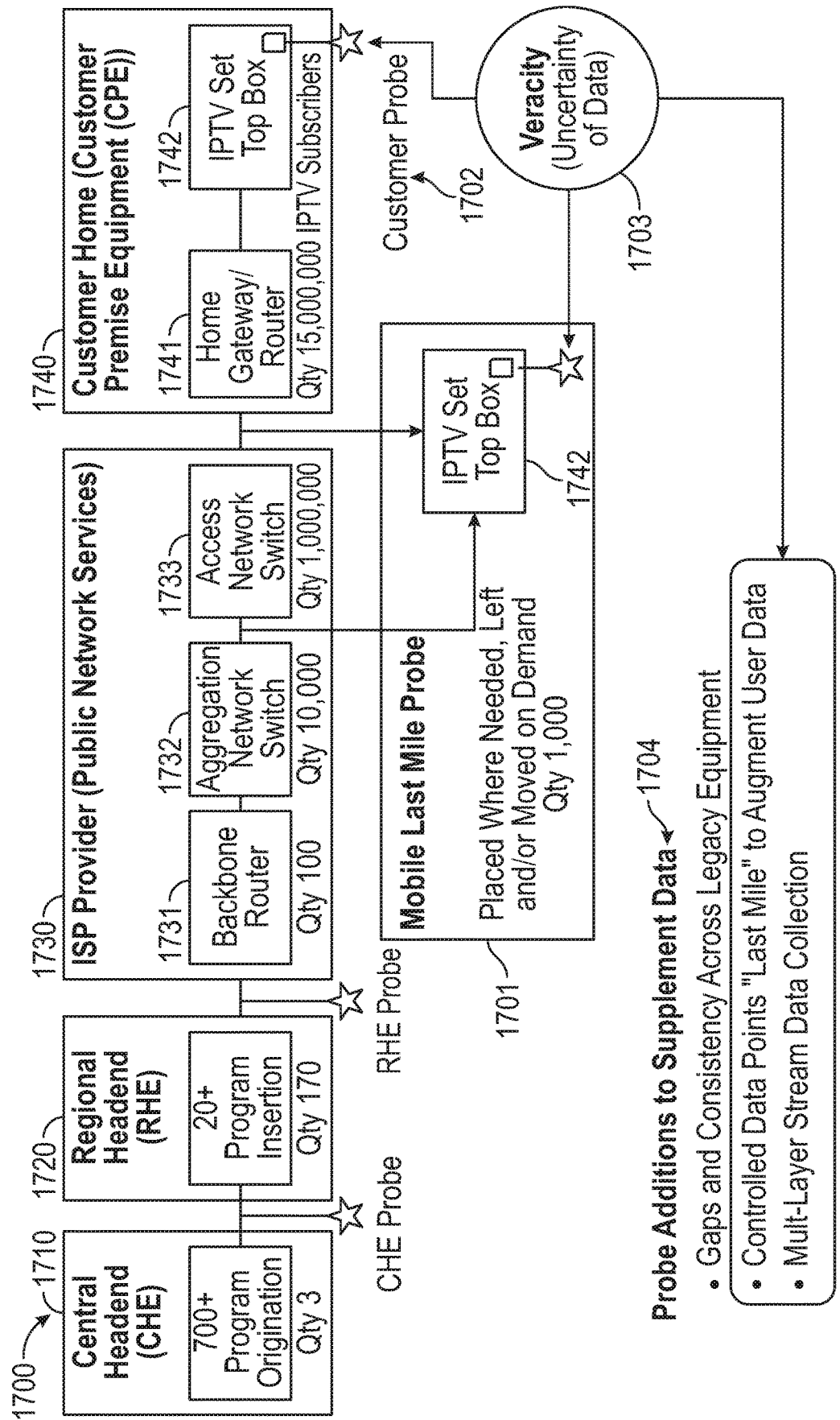
FIG. 17 is an illustration of a delivery path from a central headend, regional headend, internet service provider (ISP), through the customer home premise equipment.

FIG. 17 is an illustration of a delivery path 1700 from a central headend 1710, to a regional headend 1720, to an ISP (Public Network Services) 1730, to the customer home premise equipment 1740.

There are few central offices, for example central headends 1710, that are responsible for content creation. This portion may be thought of as components of major networks, for example, FOX, NBC, CBS, etc. The notion of three central headends 1710 is used as an example and other numbers may be equally applicable.

Media content from the central offices goes to regional offices, such as regional headends 1720. Each network may have offices in each state or group of states. Thus, there are significantly more regional headends 1720 than there are central headends 1710. A number 170 may be used as an example. A regional headend 1720 may receive media content from one or more central headends 1710 and modify the media content as is suited for regional needs. For example, a regional headend 1720 may update the transmission time based on local time zone, add region relevant information, select content that is most relevant to the region and the like.

The content is then provided to a distribution network, such as an ISP 1730. An ISP 1730 may be comprised of backbone routers, aggregation switches and access network switches. The distribution network may be thought of as a treelike structure where the backbone equipment are the roots, the aggregation servers are major branches and access servers are small branches at the ends of the major branches.

Using the tree analogy, it is easy to see that there is more equipment in the aggregation network than exists in the backbones. The number of access network equipment may also be sufficiently larger or more complex than aggregation network equipment. In examples, there may be 100 backbone routers 1731, 10,000 aggregation network switches 1732, and 1,000,000 access network switches 1733.

The content is then provided to customer home premise equipment 1740 which may comprise home gateway/routers 1741 and an IPTV set top boxes 1742. Each access network switch serves many end subscribers. As such, the number of home gateway routers is again larger than the number of access network switches. In examples, there may be 15,000,000 home gateway routers. In a single U.S. household there may be several TV sets, computers and mobile devices connected to the same home gateway router that play media content. Therefore, the number of the media players, i.e. the number of leaves on the tree, is even bigger.

A distribution network is usually well managed. Owners employ different kinds of Network Management Systems (NMS) to monitor the health of the equipment and links. This information can be retrieved using commonly known interfaces like the Simple Network Management Protocol (SNMP). However, home equipment, including IPTV set top boxes, mobile devices and computers are typically not monitored. There may be some veracity, i.e., uncertainty of data 1703. Thus, if a subscriber complains that he cannot view a show but the root cause of the problem is unknown until a technician visits the house, the problem may take days to be resolved. Depending on the uncertainty of data 1703, probe additions to supplement data 1704 may be determined and implemented.

Adding probes to the home equipment enables monitoring of the home portion of the distribution network. By collecting data from the probes of the system, it may be possible to determine precisely where a problem is occurring, for example, a cable is unplugged, set-top box (STB) power is turned off, excessive error rate between the access switch and the STB box, etc. Adding probes to the home equipment is a key enabling point for getting true reliable information about subscribers viewing experience, health of the house equipment, and condition of last mile link.

With probes added to headend offices, the loop may be closed. In this way, a full picture of the system may be visible. Thus, what was sent out from the headend offices and what was received by the end users may be completely visible to network operators, content creators and the like.

Last mile probes 1701 may be placed at the ISP 1730, for example between an aggregation network switch 1732 and an access network switch 1733. Further, last mile probe may be included at an IPTV set top box 1742 along with or in place of customer probe 1702. In embodiments, customer probes 1702 may be placed in or at the IPTV set top box 1742. Customer probes 1702, such as hardware or software based probes, may reside on a cellular phone, pad device or personal computer. Probes may provide supplemental data to fill gaps and provide consistency across legacy equipment. They may also provide controlled data points for the "last mile" to augment user data and multi-layer stream data collection.

Table 1 illustrates example Key Performance Indicators (KPIs). Table 2 illustrates example key quality indicators (KQIs). KPIs and KQIs may be utilized from GB923 "Wireless Service Measurements Solution Suite" Version 3.0, TMForum. Quality of Service (QoS) indicators may be of [ITU-T Rec.E.800]. Quality of Experience (QoE) indicators may be of [ITU-rec/T-REC-G.100]. Each one of these documents is incorporated by reference herein in its entirety.

TABLE 1

| Example KPIs | Definition |
| --- | --- |
| Service Availability Ratio | Period of time the service was available over the total time period |

TABLE 1-continued

| Example KPIs | Definition |
| --- | --- |
| % Subscriber Sessions with Degradation | Number of sessions experiencing quality degradation over the total number of active service sessions |
| Service Recovery Time | Average time to recover the service after a fault |

TABLE 2

| Example KQIs | Definition |
| --- | --- |
| K-Headend ($K_{HE}$) | Availability factor of operator equipment for media transmission |
| K-Network ($K_{Net}$) | Availability factor of the service provider network with respect to the IPTV service |
| K-Subscriber ($K_{Sub}$) | Availability factor of subscriber equipment for media reception |

KQIs and KPIs may be created, mixed and matched to conform to any number of perspectives. Depending on what information one is interested in, different subsets of raw data may be used to calculate KQIs and KPIs. For example, data may be used from all subscribers in a country. From this information, the system may determine overall availability factors ($K_{Sub}$, $K_{Net}$, $K_{HE}$) for the country.

In another example, data from each state of a country may be used separately. In this way, the system may calculate availability factors for each state and thus an identification of how each state performs may be made.

In another example, data from each county/city within a state may be relied on. In this way, the system may calculate availability factors for each county/city. This drill down allows for worst states and/or counties/cities to be identified and a direct effort and capital may be spent to improve the worst performers rather than equally spreading money between everybody including highly performing areas.

In an embodiment, a $K_{Sub}$ calculation may be made using data from a group of selected subscribers, $K_{Net}$ using data from network equipment that delivers media to this group of selected subscribers, and $K_{HE}$ from the headend equipment that transmits media streams to this group of selected subscribers. It then may be determined whether head-end equipment, network equipment, or subscriber equipment (STB and/or OTT player applications and last mile communication line) contributed most to subscriber dissatisfaction.

In an embodiment, a $K_{Sub}$ KQI may be calculated using historical data from subscribers for those who canceled the service and for those who stayed. In this way, the system can identify dissatisfactory and satisfactory KQI levels. A threshold may then be determined and an alarm may be raised when a current KQI level drops below the threshold.

In an embodiment, KQIs may be calculated using data from subscribers and networks that use cable vs. fiber optic connections. This calculation may show a difference in reliability and quality between these two technologies. It can lead to decision whether to perform a distribution network update.

In an embodiment, a $K_{Net}$ may be calculated for different network elements on the network and a $K_{Sub}$ may be calculated separately for a group of subscribers fed by these network elements. The system may then compare quality and reliability of these network elements.

In an embodiment, KQIs and KPIs may be calculated separately for each one of a plurality of media networks, such as Fox, and NBS. In this way, the system may determine which network suffered most or which was disadvantaged or treated in less favorable way by the distribution network or ISP.

In an embodiment, KQIs and KPIs may be calculated using historical data from subscribers who canceled the service and who had or did not have access to a competitor ISP. This calculation may shed light on how availability of one or more competing ISPs may change a subscriber's tolerance of service quality. There are countless ways data can be calculated depending on a needed perspective.

Examples of service availability metrics may include technology, geography, subscription, KPIs, KQIs, and the like. A technology may refer to a xPON, FTTx, etc. Geography may relate to an access switch or segment. A subscription may encompass a subscription package or a subscription of an individual subscriber. A KPI may be an indicator or measure of a certain aspect of a unique service, resource or resource group. KPI may always refer to a certain type of resource. For example, KPIs tend to be ratios, factors, or percentages based on raw parameters, other KPIs and KQIs to describe a certain aspect of a resource.

A KQI may represent a measure of a certain aspect of the functioning of a product, its component (service) or service elements, and may be derived from a variety of sources including KPI and/or KQIs tending to be more derived from complex formulas based on raw parameters and other KPIs and KQIs describing a certain functionality of a service.

KQIs may refer to sets of complex analytical computations that may be modeled to indicate the service availability of the Headend ($K_{HE}$), Network ($K_{Net}$), and Subscriber ($K_{sub}$) domains. To simplify the understanding and use of the results, the KPIs and KQIs were broken down into three domains, per the topology diagram Headend, Network, Subscriber, and designed such that any number output that was lower than 95% required corrective action. Some examples are provided below.

Figure 18:
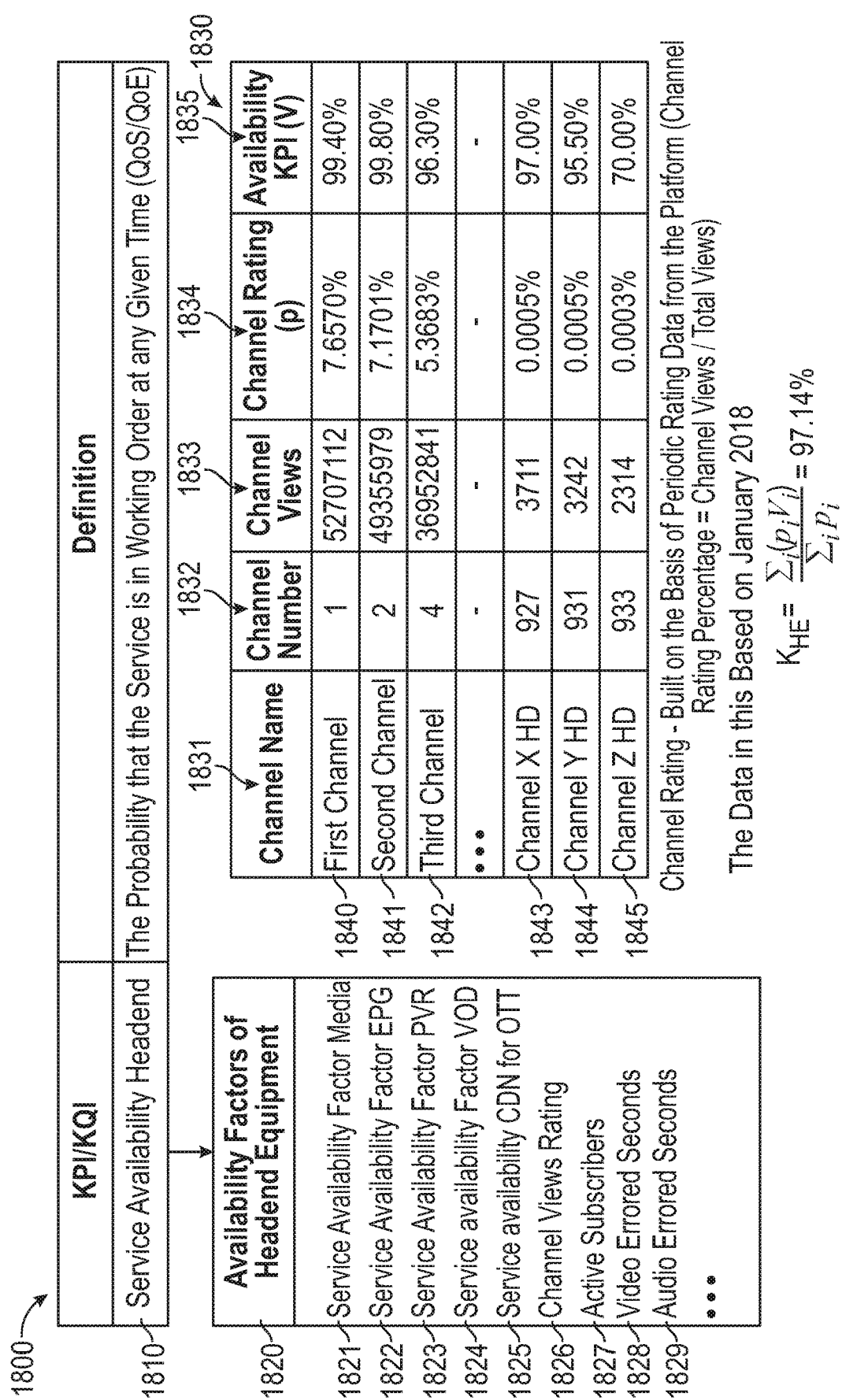
FIG. 18 includes an illustration and description of a headend service availability KQI.

FIG. 18 includes an illustration and description 1800 of a headend service availability KQI 1810. One KPI/KQI may focus on the service availability 1810 of the headend. Availability factors of the headend equipment 1820 may include a service availability factor corresponding to media 1821, a service availability factor corresponding to an EPG 1822, a service availability factor corresponding to PVR 1823, a service availability factor corresponding to VOD 1824, a service availability corresponding to CDN for OTT 1825, a channel view rating 1826, active subscribers 1827, video errored sections 1828, audio errored seconds 1829, etc. In an availability table 1830, an availability KPI 1835 is determined for each channel of a plurality of channels 1840-1845. Table 1830 organizes channels 1840-1845 by channel name 1831 and channel number 1832. The availability KPI 1835 may be based on channel views 1833 and channel rating 1834. Channel views 1833 may be equal to the number of seconds of viewing over the reporting period. Each individual service may be used in combination with active subscribers and a channel rating 1834 may be based only on the services they offer. This helps with calculating an overall "Impact Analysis" on a per channel basis. An availability factor of operator equipment for media transmission ($K_{HE}$) may be calculated via Equation 1 using the values in the Availability Table 1830. In an embodiment, the analysis may be accurate up to the second.

$$K_{HE} = \frac{\Sigma_i (p_i V_i)}{\Sigma_i p_i} \qquad \text{Equation 1}$$

In Equation 1, p is an importance weighting of the channel or service and V is the service availability of the channel or service.

Figure 19:
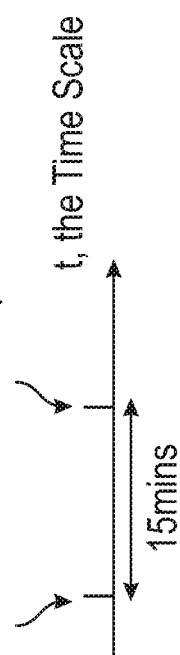
FIG. 19 includes an illustration and description of a network service availability KQI.

FIG. 19 includes an illustration and description 1900 of a network service availability KQI. The network service availability KQI 1910 focuses on the probability that the service is in working order at any given time. Since an IPTV service has many distributed components, the service availability network KQI 1910 may be generated from an equipment and redundancy scheme availability traced out to each individual subscriber. Availability factors of the service provider 1920 may include equipment accessibility 1921, redundancy availability 1922, active subscribers 1923, total access equipment with errors 1924, recovery time 1925, additional data collected from FM system 1926, additional data collected from PM system 1927, additional data collected from NMS system 1928, etc. The availability factor of the service provider network with respect to the IPTV service ($K_{Net}$) may be calculated via Equation 2.

$$K_{Net} = \frac{A_t - \frac{1}{T_{Rt}} \sum_{j=0}^{N} \left( A_j \sum_{i=1}^{M} T_{ji} \right)}{A_t} \qquad \text{Equation 2}$$

In Equation 2, $T_{Rt}$ is the total report time, $A_t$ represents the total subscribers of the service; $A_j$ represents the total subscribers for the service on the j-th access equipment; N represents the total access equipment with error seconds for the period; M represents a number of error intervals for each unit of equipment and $T_{ji}$ represents each i-th error interval on the j-th access equipment.

A trace of the signal path of the equipment may be made out to the access switches. This may be correlated with any PM/FM/or NMS fault or performance abnormalities and may be weighted based on active subscribers. If there is no one on the service, then not as big an issue. A side calculation may be performed as an overlay to impact analysis in the recovery time so they can determine the subscriber impacts based on duration of an outage. Also, in an embodiment, a dollar figure may be calculated as to any outage instantly.

Figure 20:
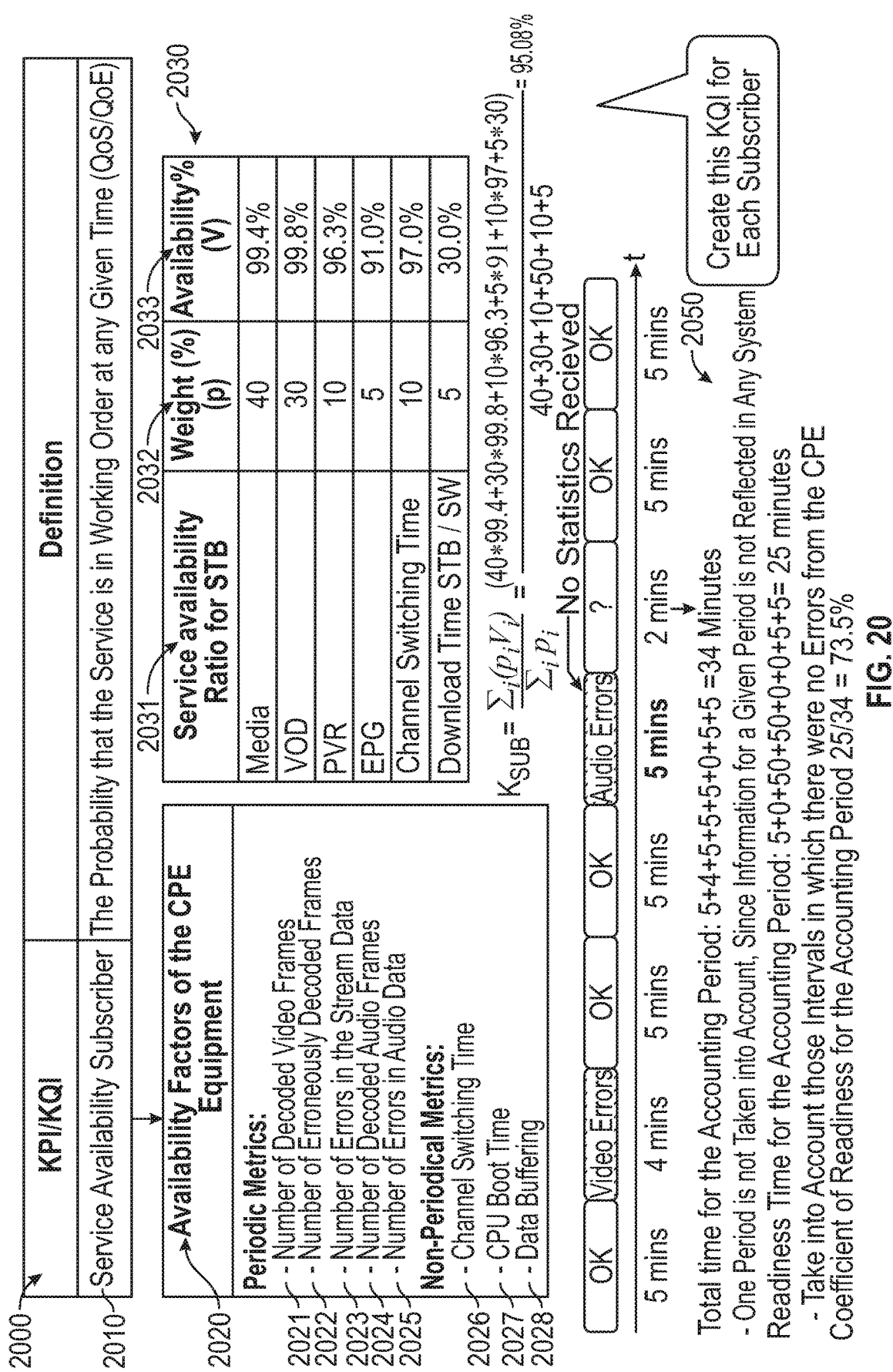
FIG. 20 includes an illustration and description of a subscriber service availability KQI.

FIG. 20 includes an illustration and description 2000 of a subscriber service availability KQI 2010. The subscriber service availability KQI 2010 focuses on the probability that the service is in working order at any given time. The subscriber focused KQI 2010 collects data from their specific elemental services and uses weightings to calculate a service availability for each individual subscriber. Availability factors of the CPE equipment 2020 may include periodic metrics such as number of decoded video frames 2021, number of erroneously decoded frames 2022, number of errors in the stream data 2023, number of decoded audio frames 2024, and number of errors in the audio data 2025, and non-periodical metrics, such as channel switching time 2026, CPU boot time 2027, and data buffering 2028. In the service availability table 2030, a weight 2032 and a service availability 2033 is determined for each elemental service 2031 (for example, media, VOD, PVR, EPG, channel switching time, download time STB/SW). Next, the service availability for an individual subscriber ($K_{Sub}$) is calculated via Equation 3 using values in the Service Availability Table 2030.

$$K_{Sub} = \frac{\sum_i (p_i V_i)}{\sum_i p_i} \qquad \text{Equation 3}$$

In Equation 3, p represents an importance weighting of a service and V represents an availability of the service.

A method 2050 for aggregating audio and video errors is illustrated. First a total time for an accounting period is calculated by adding the periods. If information for a given period is not reflected in any system, the period is not taken into account. Next, a readiness time for the accounting period is calculated. In the readiness time, periods for which there were no errors from the CPE are taken into account. The readiness time is divided by the total time to calculate the coefficient of readiness for the accounting period.

Combining all three KQIs ($K_{HE}$, $K_{Net}$, $K_{Sub}$) provides a view from a country overview with a drill down into region, to city to end subscriber. An automated dialing system may call a person who suffers an outage, but did not preemptively call to complain. This information may also be used as training data for the AI for silent suffer prediction and prevention. In an embodiment, the phone calls may target individual subscribers, subscribers within a city, region or country.

Embodiments disclosed herein may include the data collection and mining with controlled "Last Mile" probes and end-user "IoT" probes. A big data architecture may be employed to process the new and legacy data in real-time. A workflow or sequence may be created to process the data. Last mile equipment may include cellular phones, tablets and the like. Probes may be software or hardware based devices and may be resident in applications or operating systems on the equipment.

In embodiments, calculations related to the KPIs and KQIs and may employ algorithms to create predictive and prescriptive analytics.

For methods and inputs disclosed herein, machine learning may be used in churn and support request prediction. Methods include gradient boosting machines as predictive models. Gradient boosting machines are a way of making compositions of decision trees to maximize the prediction accuracy. Some implementations may include Catboost (from Yandex) and GradientBoostingClassifier (from Sklearn). Other implementations may be used as well.

Neural networks may be employed to handle time components. Some neural network types may include Recurrent Neural Networks (RNNs) and Convolution Neural Networks (CCNs). An implementation may be performed using tensorflow/keras.

Several sources of input, for example, telemetry data, subscriber metadata, and content metadata may be combined. Content metadata may include, but is not limited to, Channel names, Program name, Program genre, Channel rating, Program rating, VOD title names, VOD title genre, and VOD title rating. Subscriber metadata may include, but is not limited to Profile creation date, Location and sub_location, Last authorization date, Subscription plan (price, included channels, options, etc.), history of additional purchases (VOD, upgrades, etc.), Presence of Internet service in addition to TV service, Account type (residential or business), and Network type (FTTB, DSL, etc.) Table 3 provides example telemetry data.

TABLE 3

| Telemetry data parameter | Definition |
|---|---|
| Uptime | Time since STB was powered on. |
| Link faults | Number of TS stream Continuity Count errors during collection interval. |
| Time interval | Time interval used for statistics collection. |
| Power state | STB current state:<br>0-Sleep<br>1-Standby<br>2-Active |
| Stream type | Type of TS stream Unicast/Multicast. |
| UDP packets received | Number of UDP packets received during the collection interval. |
| Decoded video frames | Number of decoded video frames during the collection interval. |
| Video decoder errors | Number of video frames decoded with errors during the collection interval. |
| Data errors | Number of data errors during the collection interval. |
| Decoded audio frames | Number of decoded audio frames during the collection interval. |
| Audio decoder errors | Number of errors in audio data during the collection interval. |
| Session duration | Duration of current session - Time elapsed since subscriber started viewing current video content (TV channel, downloaded Movie, etc.). |
| TV is On period | Time since TV set was powered on. |
| Power state period | Time since last power state change. |
| User idle period | Time since subscriber last time pressed a button on STB Remote. |
| CPU temperature | STB CPU temperature. |
| Message counter | Statistics messages sequence number. It determines lost messages and characterizes the quality of messaging channel. |
| Media overflow | Number of events when media data arrived more than 1 second earlier than expected during the collection interval. Usually it does not impact viewing experience, but it is early indicator of irregularities in the distribution network. |
| Media underflow | Number of events when media data arrived more than 1 second later than expected during the collection interval. Usually it does not impact viewing experience, but it is early indicator of irregularities in the distribution network. |
| Delay factor | Value equal to maximum deviation of media data arrival time from expected arrival time during the collection interval. Delay Factor characterizes minimum required buffer size to smoothen media data arrival time jitter. |
| STB probe version | STB Vision agent version. Vision agent is probe embedded in STB software to collect telemetry data. |
| TS scrambled | TS stream is scrambled or encrypted. |
| Buffer underruns | Number of cases when video play was temporary paused due to lack of media data in media player receiving buffer during the collection interval. It happens when there are problems delivering media data in distribution network. |
| Buffer overruns | Number of cases when media data were discarded due to media player receiving buffer overflow during the collection interval. It happens when a burst of media data bigger than the buffer can handle arrives. |
| Average CPU utilization | Average STB CPU utilization (for each CPU core) during the collection interval. |
| Maximum CPU utilization | Maximum STB CPU utilization during the collection interval. |
| CPU cores | Number of cores STB CPU has. |
| IP ToS | Network IP ToS (Type of Service). Contains IP packets DSCP & ECN values corresponding to slowest service during the collection interval. |
| Clock Continuity errors | Number of packets with discontinuity of presentation or decoding timestamps (PTS or DTS) in TS stream as specified in the ETSI TR101 290 during the collection interval. That indicates packet loss in distribution or irregularities in transmission Head End. |
| Continuity Count errors | Continuity Count errors as specified in ETSI TR 101 290 during the collection interval. It is an indicator of incorrect packet order. |

TABLE 3-continued

| Telemetry data parameter | Definition |
|---|---|
| PID errors | PID error as specified in ETSI TR 101 290 during the collection interval. Referred Program ID (PID) does not occur for a specified period. |
| Rx physical errors | Number of errors (e.g., packet cyclic redundancy check (CRC) errors, frame alignment errors, etc.) at interface (Ethernet or WiFi) physical layer. |
| Service account | Service Account number. |
| Current bitrate | Current TS stream bitrate while using adaptive streaming (HLS). |
| CPU clock | STB CPU clock. |
| Time zone | Subscriber Time zone. |
| Power change cause | Cause of powerState change: user action, timeout. |
| HDMI status | HDMI cable status: connected, disconnected, not used (other than HDMI connection). |
| UI element ID | Identification of User Interface (UI) element, which was used to start current viewing session. |
| Buffering events | Number of times buffering has started during the collection interval. |
| Buffering seconds | Duration of "video is buffering" state during the collection interval. |
| Paused seconds | Duration of "video paused" state during the collection interval. |
| Media bitrate | Average media stream bitrate during the collection interval. |
| Interface bitrate | Average bitrate of received data as seen at physical interface during the collection interval. |
| Interface errors | Number of errors at network layer during the collection interval. |
| TS SyncLoss errors | Number of TS Synchronization errors during the collection interval. |
| Rx overflow | Number of received IP packets lost due to physical interface buffer overflow. |
| Network type | Network type: Ethernet, WiFi. |
| Ethernet interface mode | Ethernet interface mode: 10 Mbps Half duplex, 10 Mbps Full duplex, 100 Mbps Half duplex, 100 Mbps Full duplex, 1 Gbps Full duplex. |
| Content type | Currently viewed content type: Live TV, Video on Demand (VoD), Electronic Program Guide (EPG), Personal Video Recorder (PVR), Over the Top (OTT) video like YouTube. |
| Channel ID | ID of currently watched channel (for Live TV). |
| Media ID | ID of currently watched video (for VoD and PVR). |
| Switching time | Time it takes to switch STB to new channel. |
| Player URL | URL of currently played OTT video. |
| Load time | Time it takes STB to load VoD, PVR, or OTT content. |

Figure 21:
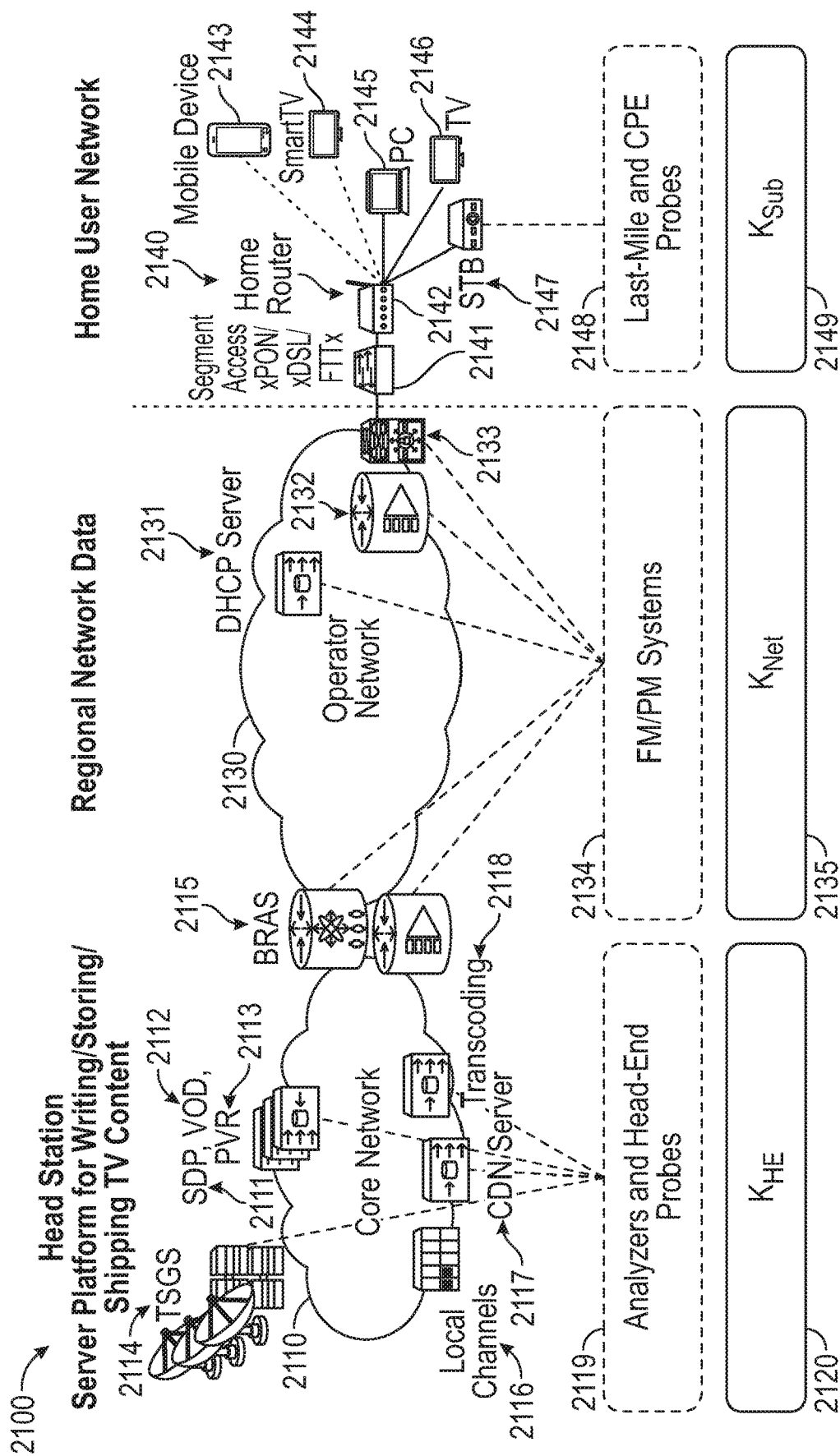
FIG. 21 is a detailed view of an end to end system topology.

FIG. 21 is a detailed view of an end to end system topology 2100. The system is broken down into three logical domains including a core network (headend) 2110, operator network 2130 and a Subscriber domain 2140. A variety of algorithms for each domain may be used to provide and model the overall system with respect to a variety of perspectives. One goal is to understand each silent sufferer.

Core network 2110 may comprise a Service Delivery Platform (SDP) 2111, Video on Demand (VOD) platform 2112, Program Video Recorder (PVR) 2113, transport stream gateway server (TSGS) 2114 and broadband remote access server (BRAS) 2115. Core network 2110 may further include or provide local channels 2116, one or more CDN servers 2117 and one or more transcoding servers 2118. Each of these servers or services may be analyzed by analyzers and head-end probes designed to interface and receive data from the servers/services. $K_{HE}$ 2120 may be derived accordingly.

Operator network 2130 may include a DHCP server 2131, routers 2132 and other network equipment 2133. $K_{Net}$ 2135 may be derived from FM/PM systems 2134 coupled to elements of the operator network 2130.

Home user network 2140 may include segment access equipment 2141, for example, an Optical Network Terminal (xPON), Digital subscriber line (xDSL) and fiber equipment among other equipment. A home router 2142 may provide access to the segment access equipment 2141 for devices including a mobile device 2143, smartTV 2144, personal computer 2145, television 2146 and a set top box 2147. Last mile and CPE probes 2148 may receive information from each one of these devices and a $K_{Sub}$ value 2149 may be ascertained.

Figure 22:
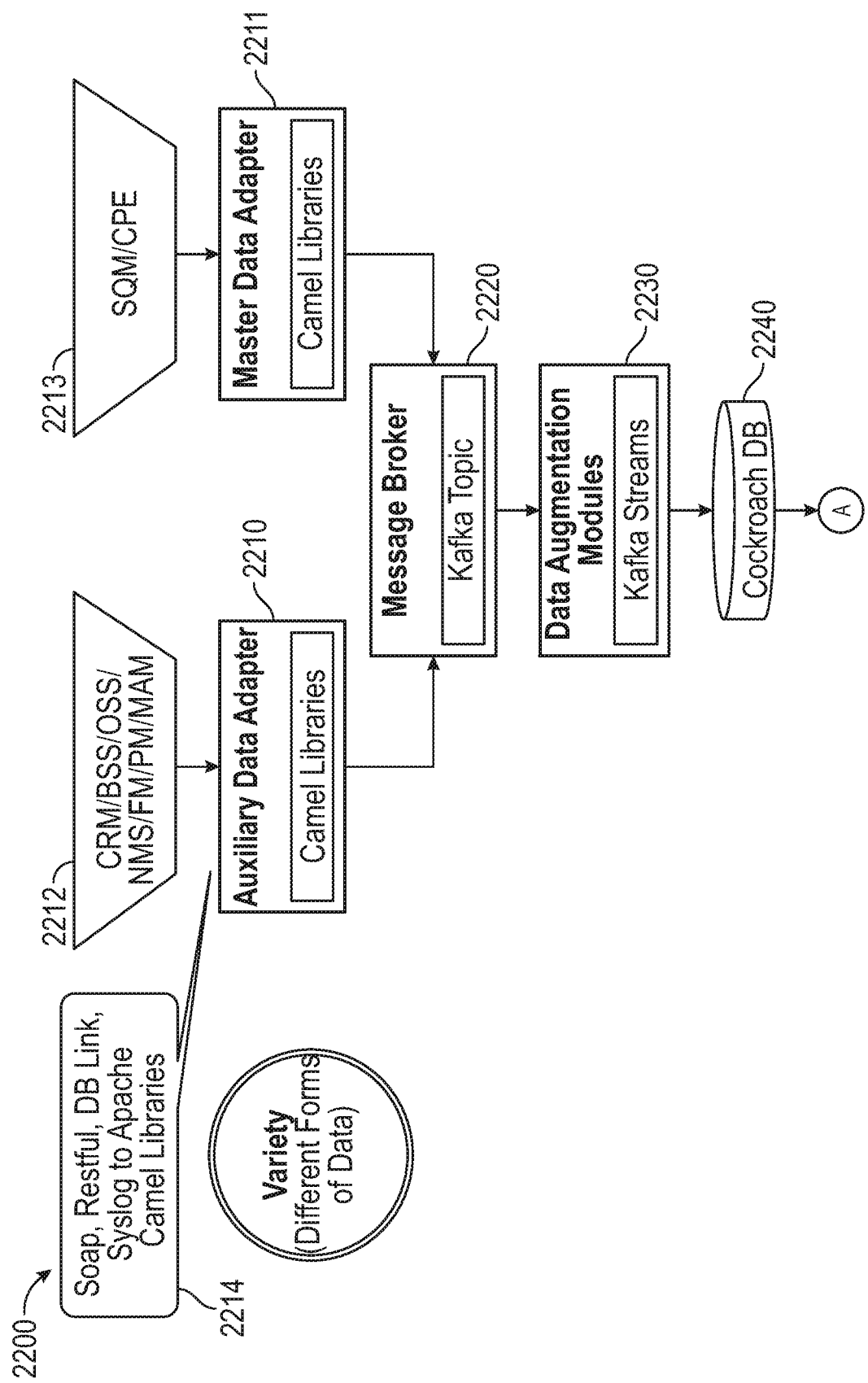
FIG. 22 is an illustration of an example system deployment.
Figure 22:
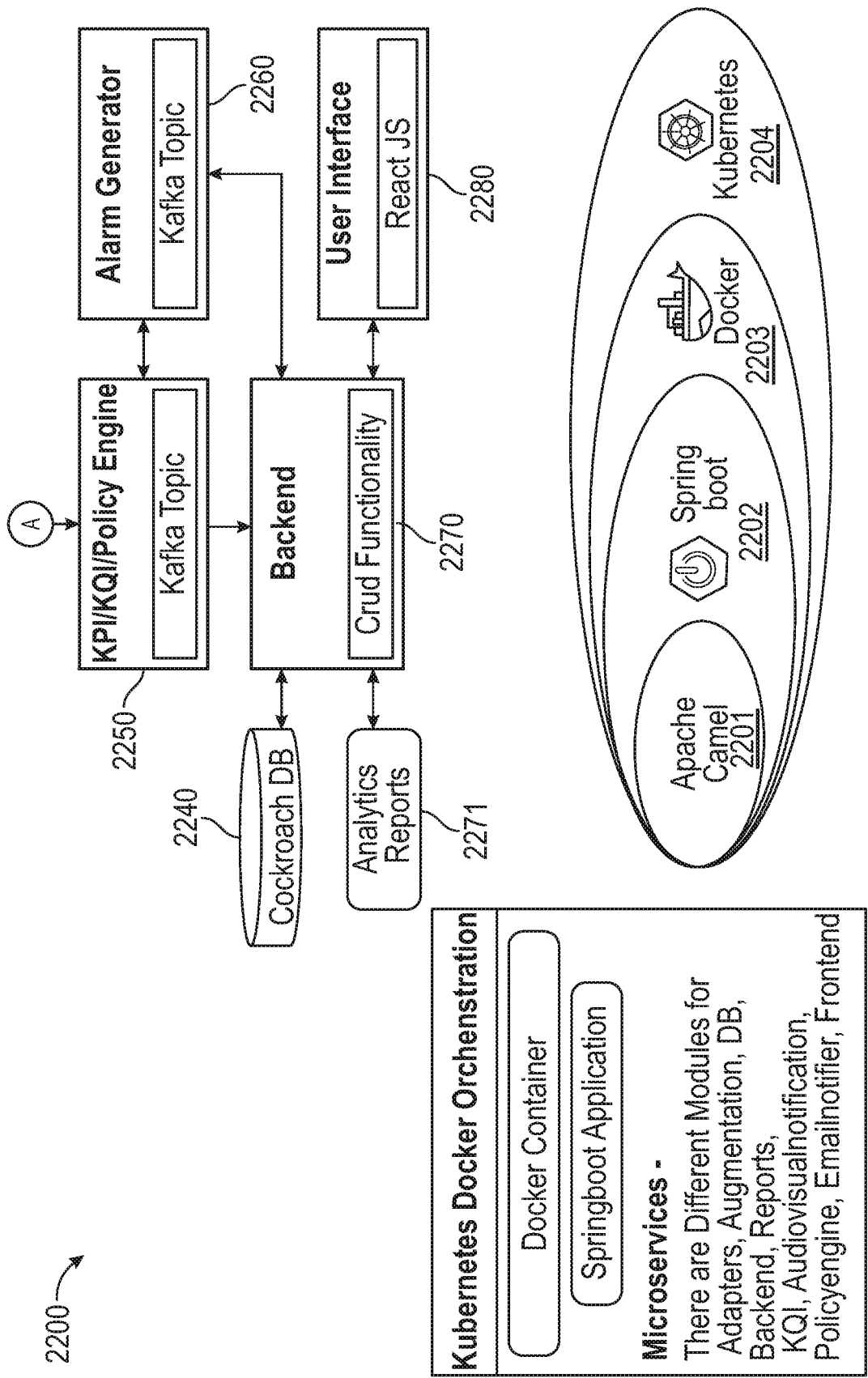

FIG. 22 is an illustration of an example system deployment 2200. All modules may be configured to run inside Docker containers 2203 managed by Kubernetes 2204. Kubernetes 2204 is a system for automating deployment, scaling and management of containerized applications. Other container systems or virtual platforms may also be used. Kubernetes 2204 is designed taking into account the micro-service architecture, which is resistant to load increase and failure of instances. In embodiments, Spring boot applications 2202 are configured to run inside Docker containers 2203 and Apache Camel 2201 is configured to run inside the Spring boot applications 2202.

The auxiliary data adapter 2210 and the master data adapter 2211 include modules 2214 intended to normalize data from various type of sources into internal representation. These modules 2214 may include, but are not limited to, Restful, DB Link, Syslog, and Camel Libraries. In the embodiment illustrated in FIG. 22, the data 2212 handled by the auxiliary data adapter 2210 may include data 2212 regarding CRM, BSS, OSS, NMS, FM, PM, and/or MAM. In addition, the data 2213 handled by the mater data adapter 2211 may include data regarding service quality management (SQM) and/or CPE data 2213.

A message broker 2220 mediates communication amongst applications, minimizing the mutual awareness that applications should have of each other in order to exchange messages, but increases system performance by enabling horizontal scaling.

Data augmentation modules 2230 may perform data augmentation to enrich and supplement incoming measurements with auxiliary data such as topology, post address, last mile probes, etc.

Data storage may include short term and long term data storage. Using long term data storage devices, data may be stored for a long duration while also allowing for quick access. Data may be split into shards on cluster instances and accessed in a 'MapReduce' manner. This approach may dramatically increase system performance. In an embodiment, ClickHouse may be employed. ClickHouse is a distributed column-oriented DBMS.

An alarm generator 2260 is a module configured to notify results exceeding configured thresholds. A relational DB may hold system configuration, for example, user related data, reporting configuration information, alarming configuration information and the like. In an embodiment, CockroachDB 2240 or PostgreSQL may be configured to automate scale and recovery procedures. Container orchestration tools like Kubernetes may be integrated in embodiments. A backend module 2270 may provide data access interfaces for UI, analytics reports 2271, and/or CRUD functionality. A user interface (UI) module 2280 may include a ReactJS based frontend application running under Nginx. Nginx is a web server with strong focus on high concurrency, performance, and low memory usage.

Create, Read, Update, Delete (CRUD) functions may be used for storing and managing a database. "Create" creates new record in the database and stores data there. "Read" retrieves a record and its data from the database on request from any other module. "Update" updates a record in the database with new data, which could be appended to old data, or could replace old data. "Delete" removes a record from the database.

In FIG. 22, the Backend module 2270 may comprise a set of elementary functions providing basic services to all other modules. A KPI/KQI/Policy engine 2250 may use the backend services to add newly calculated KPIs and KQIs to the database. It may also store, in the database, information including timestamps for all incident alerts changes.

The UI module 2280 may use the backend services to read data from the database and present information to the user via a graphical user interface (GUI). The UI module 2280 may also accept users input including configuration changes and may store or update them in the database. The analytics report module may use backend services to retrieve stored data from the database and create various reports.

Figure 23:
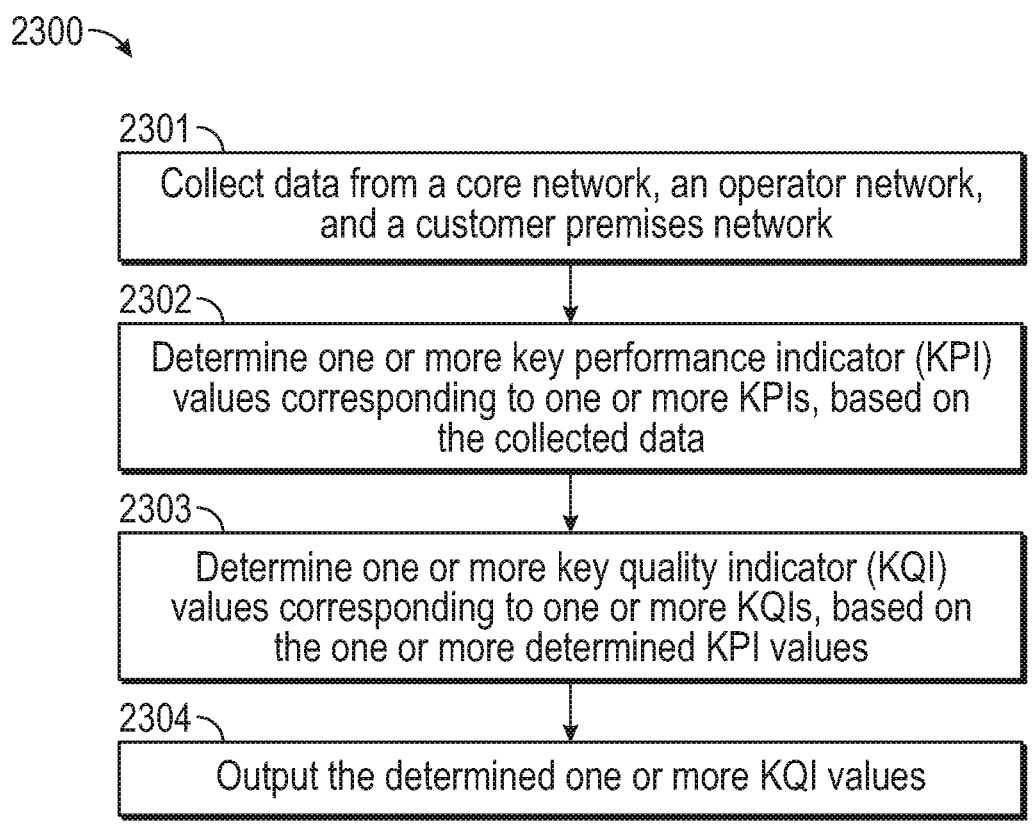
FIG. 23 is a flowchart for determining one or more KQI values.

FIG. 23 is a flowchart 2300 for determining one or more KQI values. At 2301, data is collected from a core network, an operator network and a customer premises network. Next, at 2302, one or more KPI values may be determined based on the collected data. At 2303, based on the KPIs, one or more KQI values may be determined. Finally, at 2304, the determined one or more KQI values may be output to a graphical user interface (GUI) or may be made available in a report. GUI may be an GUI of an application running on a desktop or mobile device.

Figure 24:
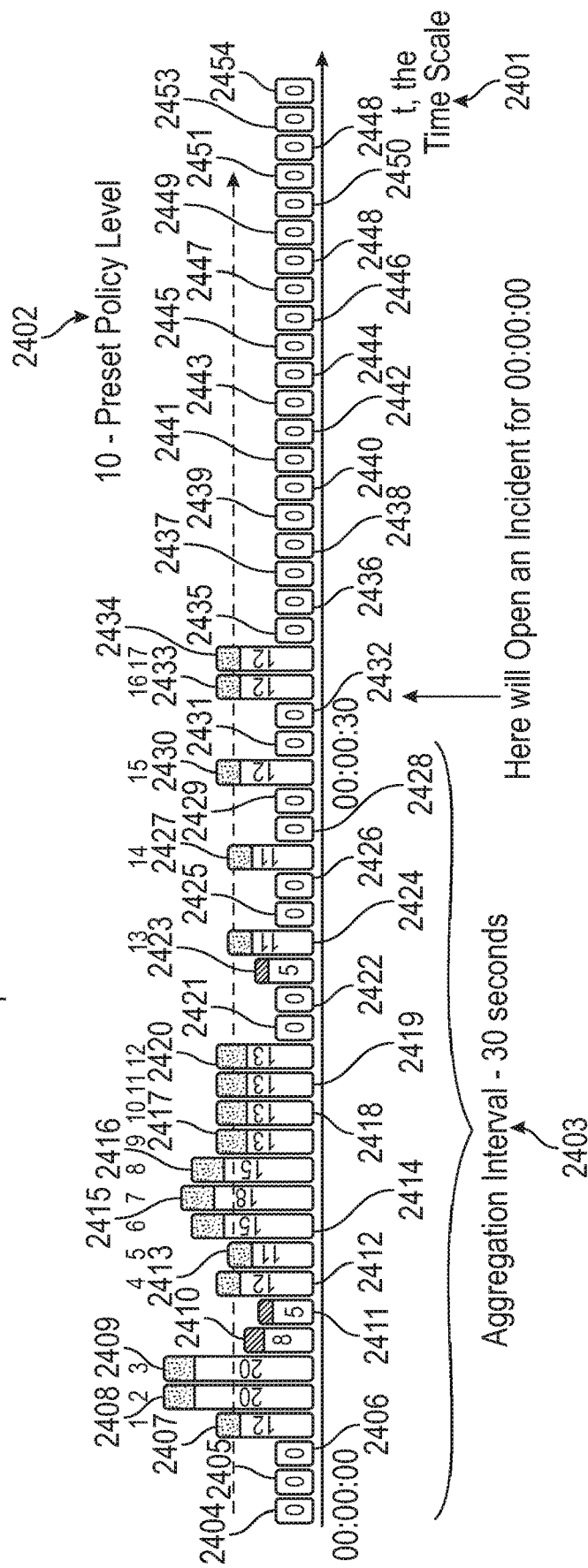
FIG. 24 is an example of a policy manager implemented using a sliding window.

FIG. 24 is an example of a policy manager 2400 implemented using a sliding window. In FIG. 24, the x axis represents time 2401. In the y direction, a number of errors within 1 second are shown as compared to a threshold level which may be configured using a preset policy level 2402. In the example shown, the preset policy level is 10 errors. The aggregation interval 2403 (or sliding window) is set to 30 seconds.

In the first three instants 2404-2406, there are 0 errors detected at each instant. In a next instant 2407, 12 errors are detected and a counter of seconds with number of errors above the threshold is incremented from 0 to 1. At a next interval 2408, 20 errors are detected and the error seconds counter is incremented again from 1 to 2. At the next interval 2409, 20 errors are again detected and the error seconds counter is incremented from 2 to 3. In the next interval 2410, only 8 errors are detected. Since 8<10, an error seconds counter is not incremented. The same may be true in the next interval 2411. Since only 5 errors are detected and 5<10, there is no increment to the error seconds counter. Subsequently, the error seconds counter will be incremented to 4 once 12 errors are detected in an interval.

In intervals 2412-2420 errors are detected above the preset policy level 2402 and thus the error seconds counter is incremented in each interval 2412-2420. Subsequently, at intervals 2421-2423, errors are detected below the preset policy level 2402 and thus the error seconds counter is not incremented. At intervals 2424, 2427, 2430, 2433 and 2434 errors are detected above the preset policy level 2402 and thus the error seconds counter is incremented in each interval 2424, 2427, 2430, 2433 and 2434. At intervals 2425, 2426, 2428, 2429, 2431, 2432 errors are detected below the preset policy level 2402. From interval 2435 onwards, there are no errors detected and thus the error seconds counter is not incremented.

A policy may refer to a settable threshold for parameters, KPIs and KQIs. Segments, aggregation intervals and error count thresholds may be adjustable to provide a representative view so as to minimize "Alarm Storms" and still drill down to get details.

In the embodiment shown in FIG. 24, the error counter is shown to remain the same at intervals in which errors are detected below the threshold. In an alternative embodiment, the error counter may be reduced or even reset upon an error being detected below the threshold.

Preferably, if the counter reaches a value which exceeds a second threshold, then an error condition may be triggered. In this way, a single error or even multiple errors over an aggregation interval may not necessarily be a cause for alarm. However, once a number of errors are detected which exceed a first threshold, in a threshold period, an error condition may need to be reported and analyzed further. The aggregation interval may coincide with time, for example, may be a previous 30 seconds from a current time instant. Alternatively, the aggregation window may trail a current time instant. The aggregation window may be advanced when thresholds are not met or exceeded.

An input to the policy manager may be a number of alarm events which happened within one second. One second is an arbitrary number and in some embodiments, the number could be 0.5 seconds, 2 seconds, 5 seconds or the like depending on granularity as needed. In an example herein, 1 second is used.

Alarm events may be video decoder errors, buffer underrun events, lost signal events or the like that impact viewing quality of a subscriber. Conceptually, this may be extended to a group of subscribers, a region, subscribers connected through a particular transmission equipment, etc. One or more alarms may be triggered or reported by network equipment, for example, a router or switch. The system is configured in terms of the perspective the system user is interested in.

Example pseudocode is illustrated below.

```
Initialize array Errors of size 30 to 0
i = 0
Sum = 0
Repeat 30 times
    Errors[i] = (number of received errors during last second)
    Sum = Sum + Errors[i]
    i = i + 1
    Wait 1 second
End Repeat
Repeat indefinitely
    If (Sum/30) is greater than (Incident_set_threshold) then
        set Incident_alert with timestamp equal to current time − 30 seconds
    If (Sum/30) is less than (Incident_clear_threshold) then
        clear Incident_alert with timestamp equal to current time
    i = 0
    Sum = Sum − Errors[0]
    Repeat 29 times
        Errors[i] = Errors[i+1]
        i = i +1
    End Repeat
    Errors[29] = (number of received errors during last second)
    Sum = Sum + Errors[29]
        Wait 1 second
End Repeat
```

In the above pseudocode, an aggregation_interval is configured at 30 seconds, however, other 15, 45 or 60 seconds may be configured, among other choices. Incident_set_threshold is a configurable parameter. An incident alert may be set when an average number of alarm events per second received during the aggregation interval exceeds the Incident_set_threshold. Incident_clear_threshold is also a configurable parameter. Incident alert may be cleared when an average number of alarm events per second are received during the aggregation interval drops below the Incident_clear_threshold.

Figure 25:
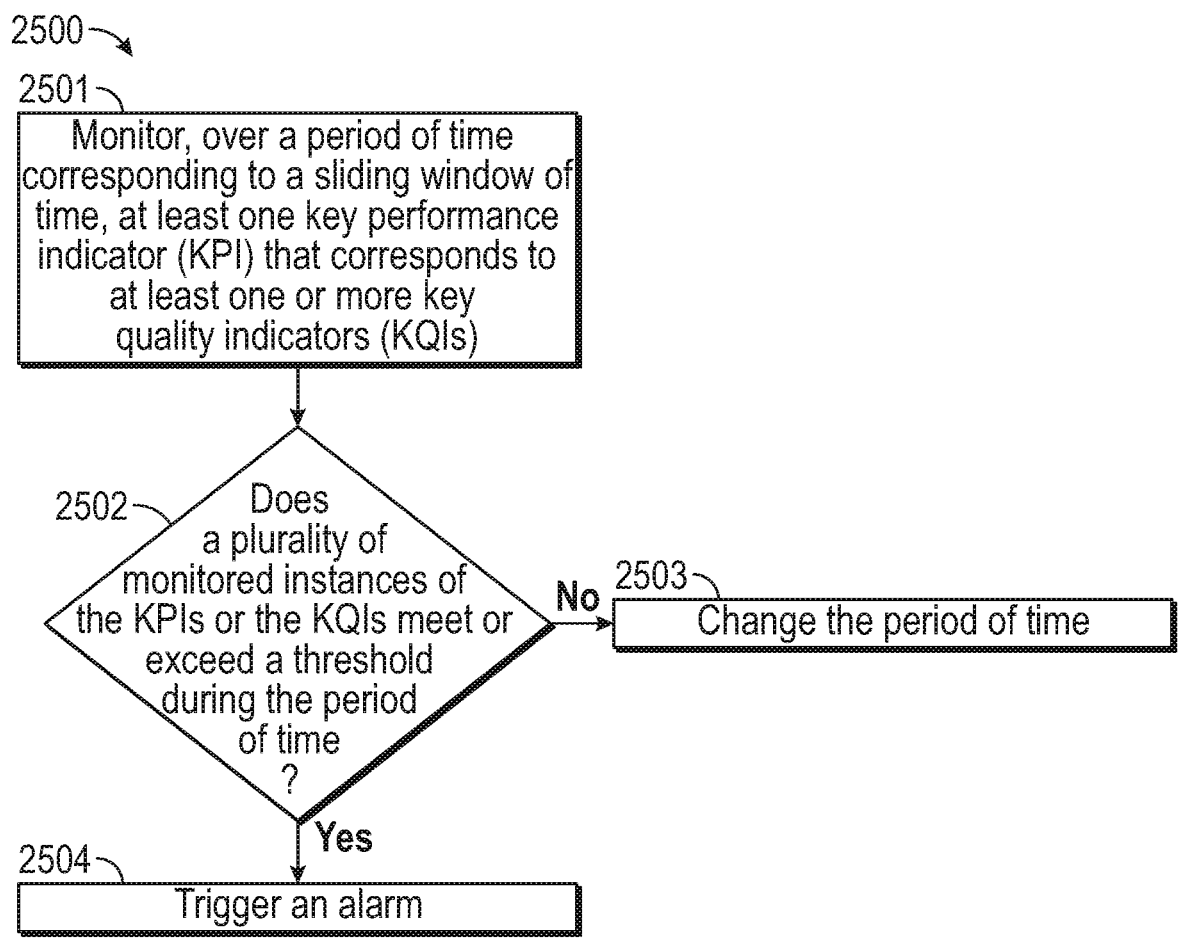
FIG. 25 is a flowchart which illustrates an example monitoring method.

FIG. 25 is a flowchart which illustrates an example monitoring method 2500. Step 2501 comprises monitoring, over a period of time corresponding to a sliding window of time, at least one KPI which corresponds to one or more KQIs. At 2502, if the plurality of monitored instances of the KPIs or KQIs meets or exceeds a threshold during the period of time, an alarm may be triggered at 2504. If not, the period of time may simply be advanced and no alarm may be raised at 2503.

Figure 26:
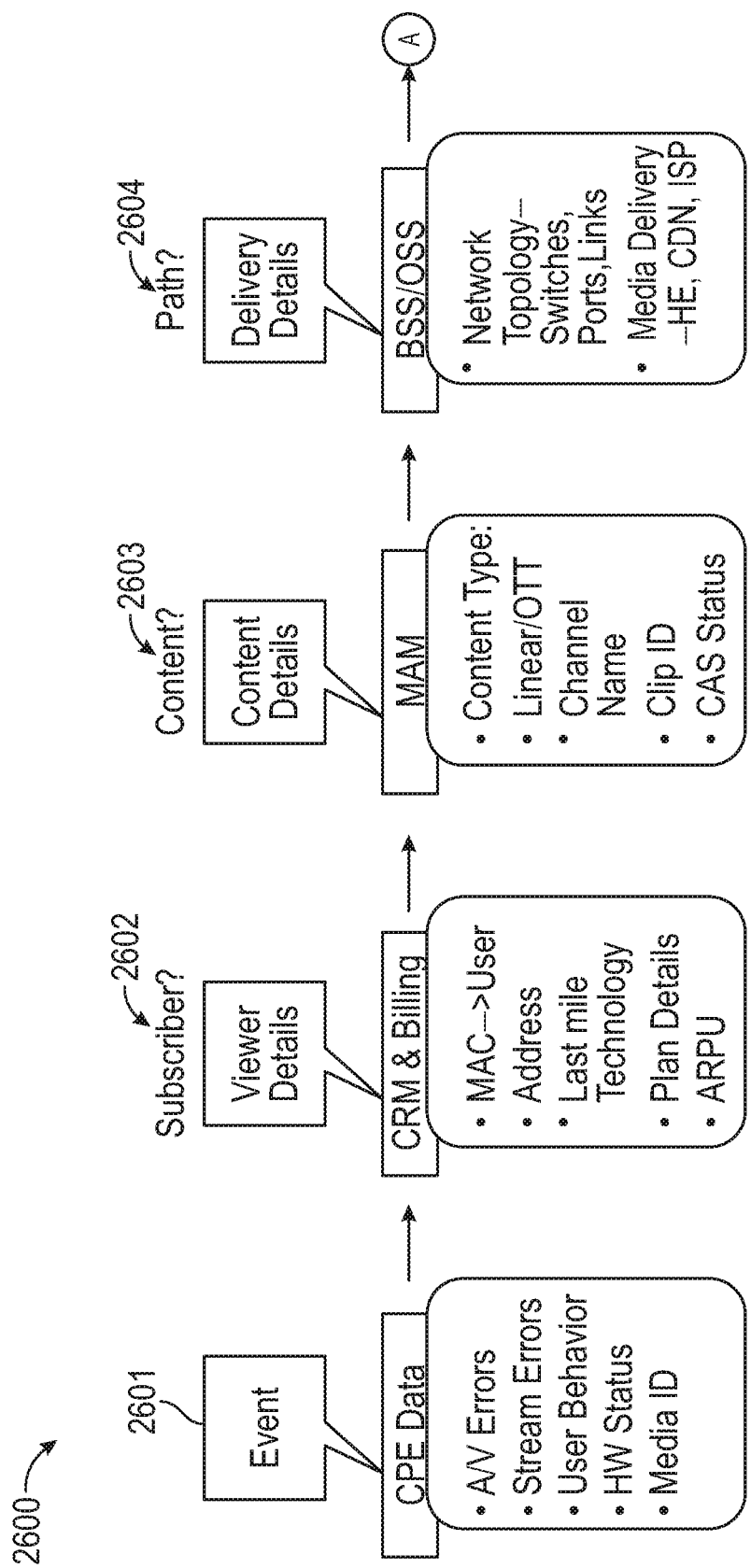
FIG. 26 is a flowchart of an error detecting and response generating procedure.
Figure 26:
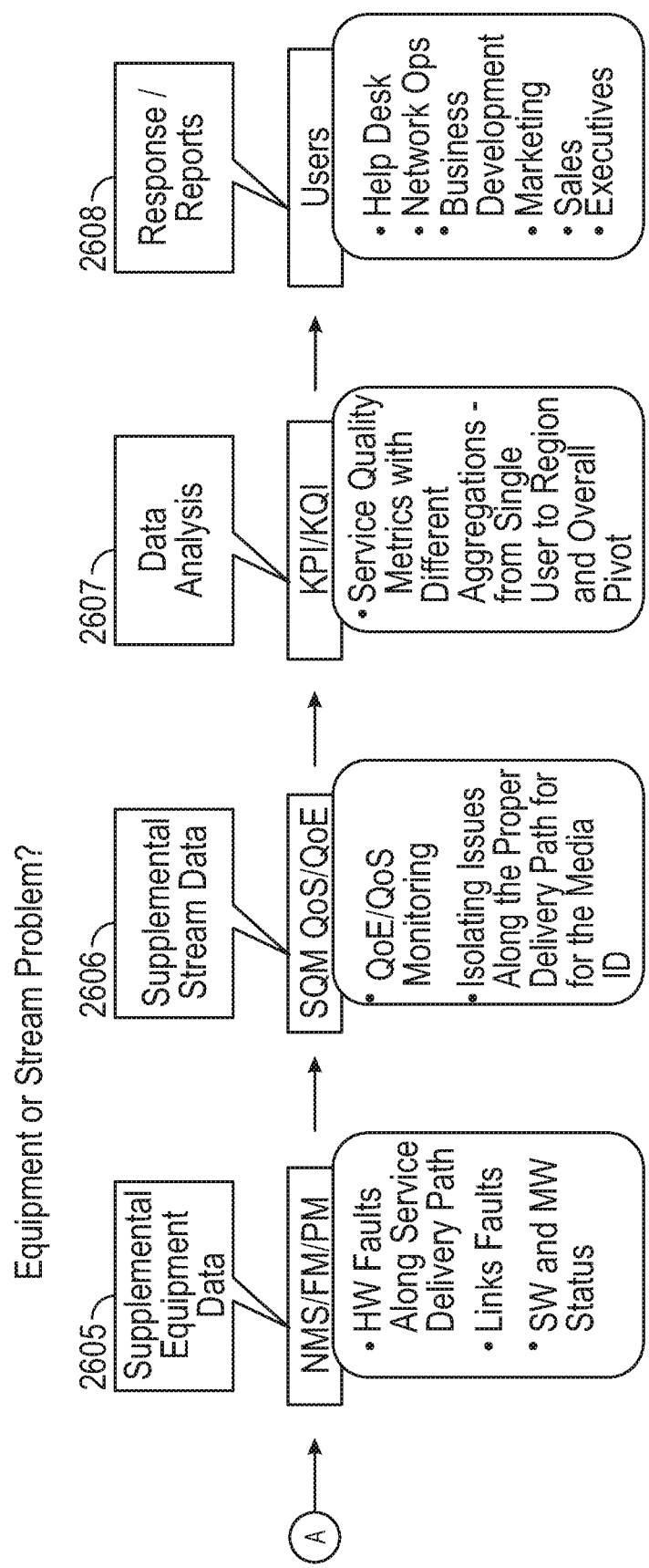

FIG. 26 is a flowchart of an error detecting and response generating procedure 2600. At 2601, errors and events may be determined via normal polling operation and via a push model. With a normal polling operation, periodic results and baseline analysis may be obtained periodically. Using a push model, alerts may be generated and pushed, from one or more user or other probes and devices, based on an error or event error being detected.

When an event is detected, for example, an A/V event, stream errors, user behavior issue, hardware status error a media ID associated with a viewed content may be detected. This may not be the case if there is no media ID currently being viewed, but another error is detected.

At 2602, if the error can be traced to a subscriber, the MAC address may be determined as well as any last mile technology used. The user's plan details and average revenue received from the user may also be determined. This information may be helpful in determining how critical the error is. For example, if the user's plan is a low level or basic level plan, the error may be less of a concern than to a high paying user. A subscribers address or geographic location, last mile technology, plan details and ARPU may all be determined.

At 2603, a content type may be determined. For example whether the content is a linear content type or OTT type. The channel name and clip identifier are aspects of the content type. A CAS status may be ascertained.

At 2604, delivery details may be obtained. For example, the network topology may be determined and switches, ports and links may be recorded. Information regarding media delivery, for example, HE, CDN and ISP related information may be recorded.

It may be important to ascertain whether there are any hardware faults along the delivery path. At 2605, these faults may be recorded as supplemental equipment data and may comprise hardware faults or link faults. Supplemental equipment data may further comprise SW and MW status.

At 2606, supplemental stream data may be assessed. For example, a QoS/QoE may be monitored and issues along the proper delivery path may be isolated for the media ID.

At 2607, a data analysis may be performed as it relates to KPIs or KQIs. For example, the error may be analyzed in accordance with KPIs or KQIs to determine what affect the error may have had on different users or different user aggregations. The error may be analyzed with respect to the known affected user but also within the user's region and with respect to an overall pivot area.

At 2608, in response to the error and data analysis performed, a number of response strategies may be undertaken. In one embodiment, reports may be assembled and sent within an organization. For example, one response may be an automated response and the error may be mitigated with the help of a help desk support representative or help desk software. A network operation response may also be performed, for example, a software upgrade may be performed and/or a patch may be applied. In other embodiments, reports may be provided to business development, marketing, sales or executives.

Figure 27:
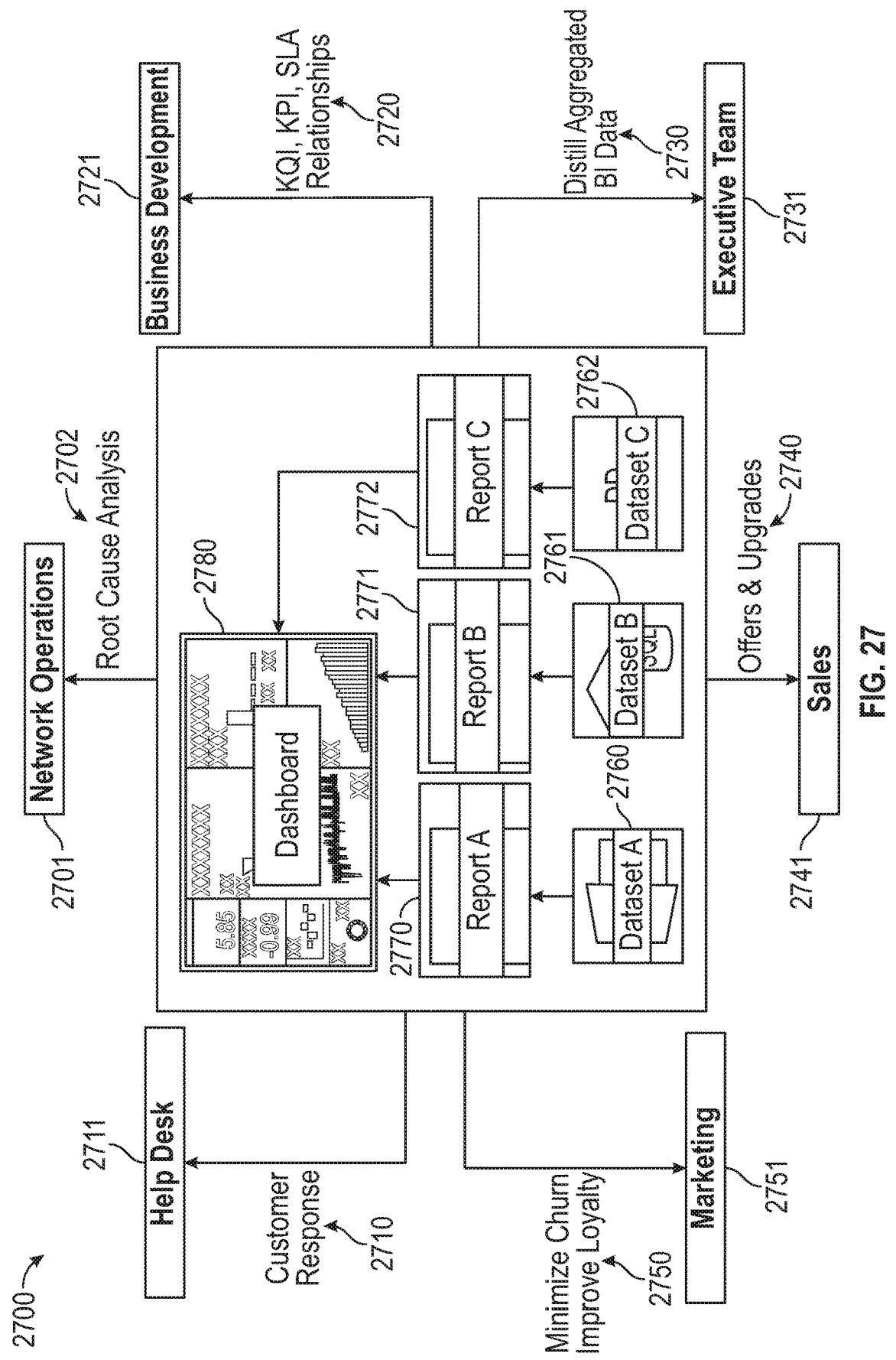
FIG. 27 is an illustration of a report generation procedure.

FIG. 27 is an illustration of report generation 2700. In the embodiment shown in FIG. 27, subscriber insights may be determined and reports may be generated and provided to various groups within an organization. Reports may relate to information on silent sufferers or sufferers who have not yet complained to the organization. Reporting may be based on a churn pattern analysis, risk detection, prediction and prevention, informed rapid response tech support and customer care.

Reporting may be based on the data augmentation performed in FIG. 26. For example, errors detected at 2601 are augmented by info obtained from different systems: CRM & Billing at 2602, MAM at 2603, BSS/OSS at 2604, NMS/FM/PM at 2605, and SQM at 2606. Then data obtained may be analyzed together and a KPI/KQI calculated at 2607. The response/reports generated at 2608 may correlate to report A through report C 2770-2772 of FIG. 27.

In one embodiment, a customer response report 2710 may be provided to a helpdesk 2711. The customer response report 2710 may comprise information about the customer and errors detected. A report may be provided to a network operations center 2701 and may include a root cause analysis 2702. The root cause analysis 2702 may indicate the particular network or other errors which were detected. A report may comprise KQI and KPI information which may be interpreted by a business development team. The report may indicate SLA relationships.

Other reports may be provided to an executive team 2731, for example, a report which distills aggregated BI data 2730. The sales department 2741 may be provided with offers and upgrades 2740 which can be offered or suggested to a subscriber. A marketing department 2751 may receive a report which is geared toward minimizing churn and improve subscriber loyalty 2750. A business development department 2721 may receive a report which is directed to KQI, KPI, and SLA relationships 2720.

Reports 2770-2772 may include information concerning subscriber insights on silent sufferers, and may also include a churn pattern analysis, risk detection, prediction and prevention, informed rapid response tech support and customer care.

Reports 2770-2772 may include information on an infrastructure investment strategy. For example, information may relate to a network analysis & optimization, network modernization. Reports 2770-2772 may include information to dynamically manage content distribution networks, cache servers, and SDN bandwidth. This information may allow a service provider to determine the biggest bang for the buck, i.e. to determine the highest ROI.

Reports 2770-2772 may include sources of data for business intelligence (BI), for example, to grow ARPU, to optimize inventory or to better understand competitive and other external influencers. In this way, a closed loop service quality management paradigm may be implemented, i.e. know, predict and proactively prevent. Reports may be generated based on datasets 2760-2762 which may include any dataset or any combination of datasets disclosed herein. Report data may be viewed on a dashboard 2780 which may or may not be remote to a user. Dashboard 2780 may comprise a plurality of screens which display report contents and KPI/KQI information to a user.

Figure 28:
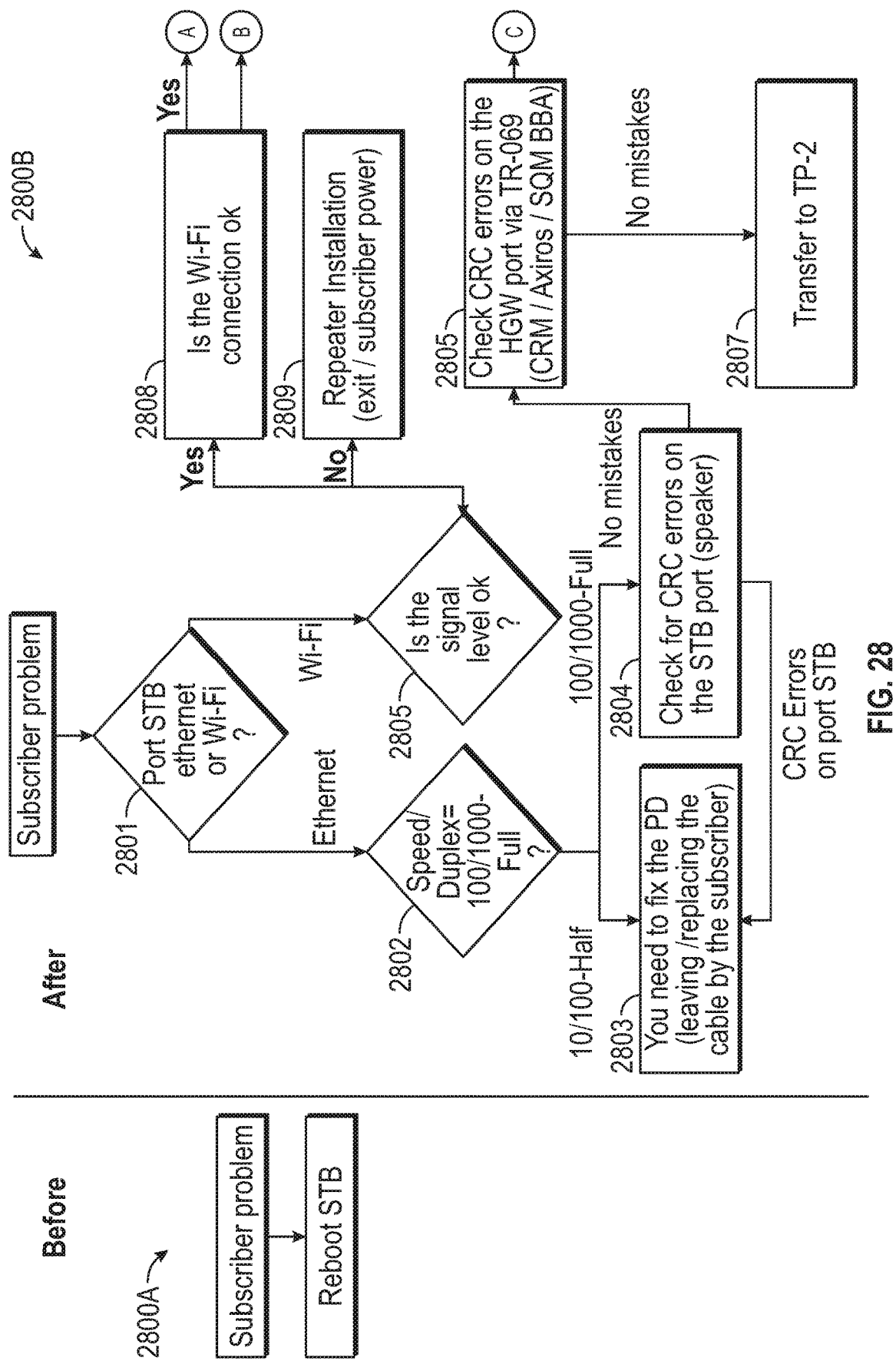
FIG. 28 illustrates two flow charts.
Figure 28:
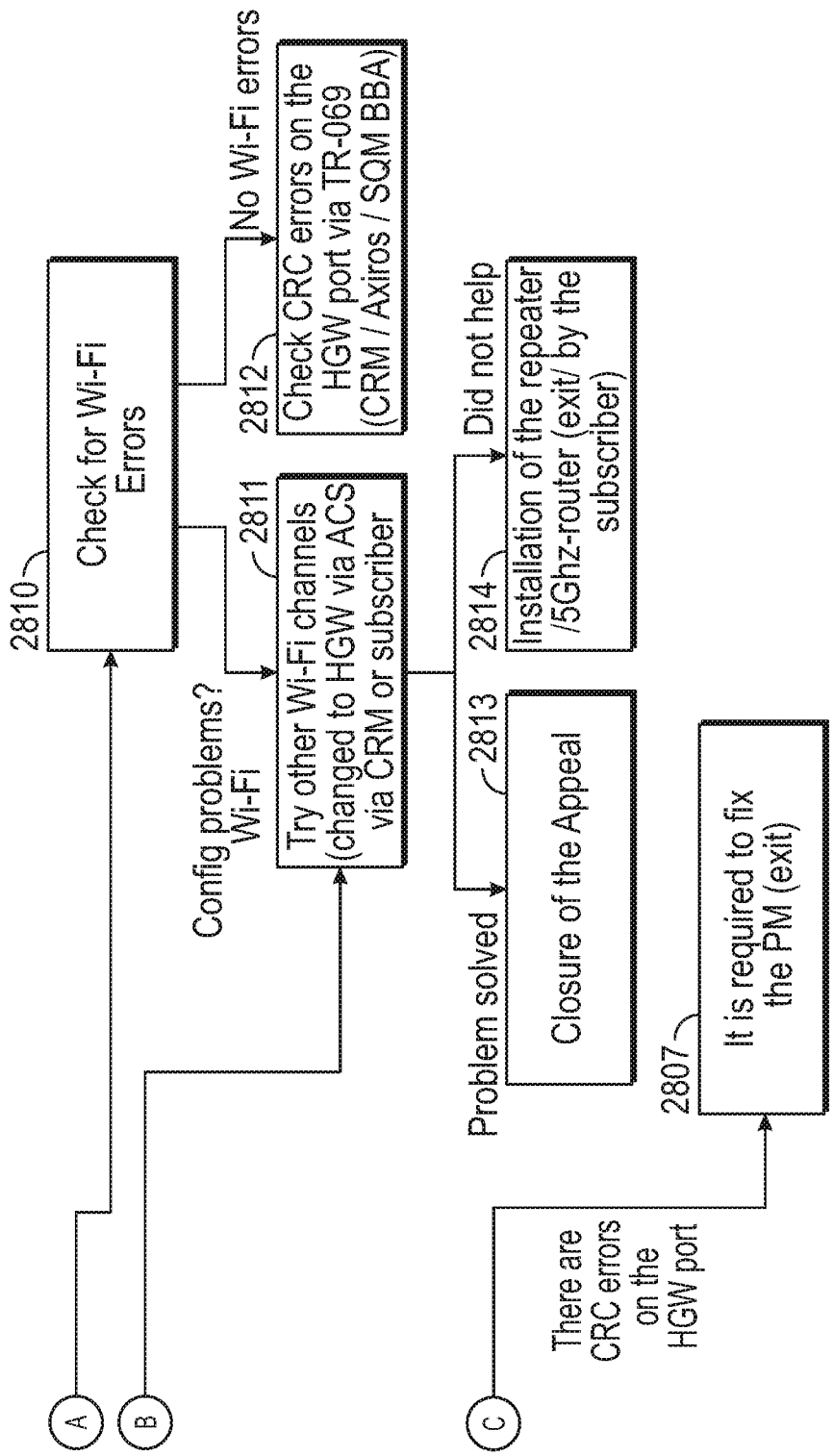

FIG. 28 illustrates two flow charts 2800A and 2800B. Flowchart 2800A shows that, in prior art systems, when a subscriber called in to a help desk with a problem, the usual advice was to reboot everything (Cable Modem, Router, STB, etc.). This is typically something that users find annoying and time consuming.

Because errors can be detected automatically and because so much information on a client/subscriber has been assembled, troubleshooting time may be minimized. In many cases, errors and error events may be managed in the background without any assistance provided by a subscriber.

Flowchart 2800B illustrates a method for solving a subscriber problem. At step 2801 it is determined whether the port is STB Ethernet or WiFi. If Ethernet, the speed/duplex is determined at 2802. If the speed/duplex is 10/100-Half, the method proceeds to 2803 where the PD must be fixed by leaving/replacing the cable by the subscriber. If the speed/duplex is 100/1000-Full, the method proceeds to 2804 where a cyclic redundancy check (CRC) for errors on the STB is performed. If there are CRC errors on port STB, then the method proceeds to 2803. If there are no mistakes, the method proceeds to 2805, where a CRC check on the home gateway (HGW) is performed. If there are mistakes, there are CRC errors on the HGW port and the method proceeds to 2806 and the PM must be fixed. If there are no mistakes, the problem is transferred to a level 2 technical professional (TP-2) at 2807.

If the Post STB is WiFi, it is determined whether the signal level is satisfactory at 2805. If the signal level is not satisfactory, the method proceeds to 2808 and repeater in installed at 2809. If the signal level is satisfactory, then it is determined whether the Wi-Fi connection is satisfactory at 2808. If the WiFi connection is satisfactory, then the Wi-Fi is checked for errors at 2810. If there are configuration errors, the method proceeds to 2811 and other Wi-Fi levels are tried. If the problem is solved, the appeal is closed at 2813. If changing the Wi-Fi channel did not help, the method proceeds to 2814, and a repeater/5 GHz-router is installed. If there are no Wi-Fi errors at 2810, then the method proceeds to 2812, where a CRC check on the HGW is performed.

Figure 29:
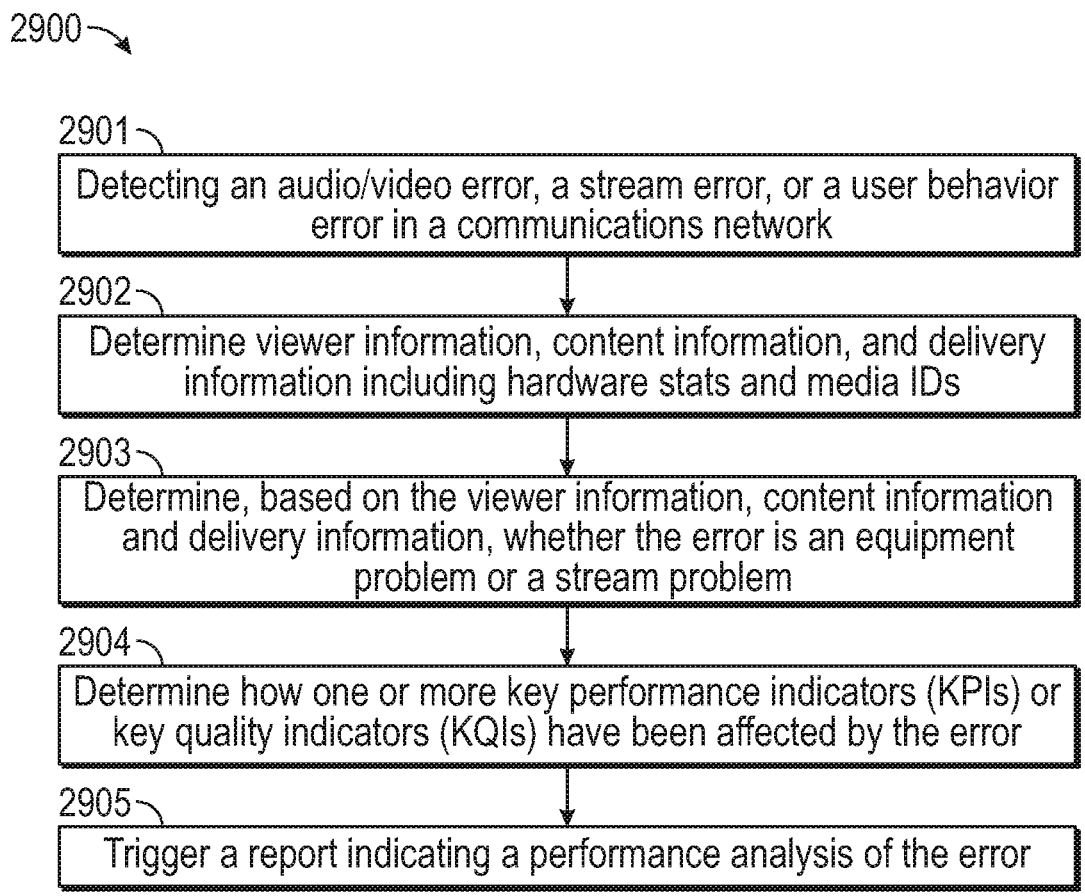
FIG. 29 is a flowchart which illustrates a report triggering procedure.

FIG. 29 is a flowchart which illustrates a report triggering procedure 2900. At 2901, an audio/video error, a stream error or a user behavior error may be detected in a communications network. Upon detecting the error, viewer information, content information and delivery information including hardware statistics and media ID(s) may be determined at 2902. Based on the viewer information, content information and delivery information, a determination as to whether the error relates to an equipment problem or stream problem may be made at 2903. One or more KPIs or KQIs may be affected by the error and an evaluation of KPI/KQI values may need to be made at 2904. At 2905, based on a change in value of the KPIs or KQIs, a report may be generated indicating how the error has affected performance.

What is claimed is:
1. A method comprising:
monitoring at least one key performance indicator (KPI) corresponding to at least one or more key quality indicators (KQIs) over a period of time;
determining whether a plurality of monitored instances of the at least one KPI exceed an error count threshold during the period of time, wherein the error count threshold is determined based on subscriber cancelation data; and
on a condition that the error count threshold is met or exceeded during the period of time, triggering an alarm;
wherein the period of time corresponds to a sliding window of time, wherein the sliding window of time changes in time, when the error count threshold is not met or exceeded.

2. The method of claim 1, wherein the at least one KPI includes at least one of a channel change rate or a picture quality metric.

3. The method of claim 1, wherein the at least one KPI includes at least one of a service availability ratio, a number of subscriber sessions with a degradation and a service recovery time.

4. The method of claim 1, wherein the KQIs include one or more of an availability factor of operator equipment for media transmission, an availability factor of a service provider, and an availability factor for media reception at customer premise equipment (CPE).

5. The method of claim 4, wherein the period of time is a variable period of time.

6. The method of claim 4, wherein the availability factor of the service provider is a factor of at least one or more periodic metrics including: a number of decoded video frames, a number of erroneously decoded frames, a number of errors in stream data, a number of decoded audio frames and a number of errors in audio data.

7. The method of claim 4, wherein the availability factor for media reception is a is a factor of at least one or more non-periodic metrics including: a channel switching time, CPU boot time or a data buffering metric.

8. The method of claim 1, wherein the KPIs include at least one of: a service availability ration, a percentage of subscriber sessions with service degradation and a service recovery time.

9. A system comprising:
circuitry configured to monitor at least one key performance indicator (KPI) corresponding to at least one or more key quality indicators (KQIs) over a period of time;
circuitry configured to determine whether a plurality of monitored instances of the at least one KPI exceed an error count threshold during the period of time, wherein the error count threshold is determined based on subscriber cancelation data; and
circuitry configured to, on a condition that the error count threshold is met or exceeded during the period of time, trigger an alarm;
wherein the period of time corresponds to a sliding window of time, wherein the sliding window of time changes in time, when the error count threshold is not met or exceeded.

10. The system of claim 9, wherein the at least one KPI includes at least one of a channel change rate or a picture quality metric.

11. The system of claim 9, wherein the at least one KPI includes a service availability ratio, a number of subscriber sessions with a degradation and a service recovery time.

12. The system of claim 9, wherein the KQIs include one or more of an availability factor of operator equipment for media transmission, an availability factor of a service provider, and an availability factor of subscriber equipment for media reception.

13. The system of claim 9, wherein the period of time is a variable period of time.

14. The system of claim 12, wherein the availability factor of the service provider is a factor of at least one or more periodic metrics including: a number of decoded video frames, a number of erroneously decoded frames, a number of errors in stream data, a number of decoded audio frames and a number of errors in audio data.

15. The system of claim 12, wherein the availability factor of the subscriber equipment is a factor of at least one or more non-periodic metrics including: a channel switching time, CPU boot time or a data buffering metric.

16. The system of claim 12, wherein the KPIs include at least one of: a service availability ration, a percentage of subscriber sessions with service degradation and a service recovery time.

17. A system comprising:
circuitry configured to monitor an indicator over a period of time, wherein the indicator corresponds to one or more of a channel change rate, a network inaccessibility time or a picture quality metric;
circuitry configured to determine whether the indicator exceeds an error count threshold during the period of time, wherein the error count threshold is determined based on subscriber cancelation data; and
circuitry configured to, on a condition that the error count threshold is met or exceeded during the period of time, trigger an alarm;
wherein the period of time corresponds to a sliding window of time, wherein the sliding window of time changes in time, when the error count threshold is not met or exceeded.

* * * * *